United States Patent
Lee et al.

(10) Patent No.: US 11,258,475 B2
(45) Date of Patent: Feb. 22, 2022

(54) ELECTRONIC DEVICE FOR ATTENUATING AT LEAST PART OF SIGNAL RECEIVED BY ANTENNA AND METHOD FOR CONTROLLING COMMUNICATION SIGNAL

(71) Applicant: Samsung Electronics Co., Ltd., Gyeonggi-do (KR)

(72) Inventors: Youngmin Lee, Gyeonggi-do (KR); Yongjun An, Gyeonggi-do (KR); Yuseon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/710,391

(22) Filed: Dec. 11, 2019

(65) Prior Publication Data

US 2020/0186400 A1 Jun. 11, 2020

(30) Foreign Application Priority Data

Dec. 11, 2018 (KR) .......................... 10-2018-0159295

(51) Int. Cl.
*H04B 1/525* (2015.01)
*H04B 1/40* (2015.01)
(Continued)

(52) U.S. Cl.
CPC .............. *H04B 1/525* (2013.01); *H04B 1/10* (2013.01); *H04B 1/40* (2013.01); *H04L 25/03828* (2013.01)

(58) Field of Classification Search
CPC .................... H04B 1/40–588; H04L 25/03828
See application file for complete search history.

(56) References Cited

U.S. PATENT DOCUMENTS

| | | | | |
|---|---|---|---|---|
| 5,117,505 A | * | 5/1992 | Talwar | H04B 1/126 343/853 |
| 5,548,838 A | * | 8/1996 | Talwar | H04B 1/126 455/272 |

(Continued)

FOREIGN PATENT DOCUMENTS

| | | |
|---|---|---|
| CN | 104124526 A | 10/2014 |
| KR | 10-2016-0088948 A | 7/2016 |

(Continued)

OTHER PUBLICATIONS

International Search Report dated Apr. 1, 2020.
European Search Report dated Oct. 13, 2021.

*Primary Examiner* — Gennadiy Tsvey
(74) *Attorney, Agent, or Firm* — Cha & Reiter, LLC

(57) ABSTRACT

An electronic device according to a disclosed embodiment includes a first antenna, a second antenna, a first communication circuit configured to communicate in a first frequency band with the first antenna at a first data rate, a second communication circuit configured to communicate in a second frequency band with the second antenna at a second data rate, a first coupler electrically connected between the first antenna and the first communication circuit, and at least one communication circuit configured to control to identify, during at least part of a period of simultaneously transmitting a first transmit signal with the first antenna and a second transmit signal with the second antenna, an amplitude of a first receive signal including at least part of the second transmit signal detected by the first coupler, disable an operation of attenuating the at least part of the second transmit signal included in the first receive signal based on the amplitude of the first receive signal falling in a first designated range, and enable the operation of attenuating the at least part of the second transmit signal included in the first (Continued)

receive signal based on the amplitude of the first receive signal falling in a second designated range.

20 Claims, 16 Drawing Sheets

(51) Int. Cl.
*H04B 1/10* (2006.01)
*H04L 25/03* (2006.01)

(56) References Cited

U.S. PATENT DOCUMENTS

| | | | | |
|---|---|---|---|---|
| 5,574,978 A * | 11/1996 | Talwar | ............... | H04B 1/126 455/296 |
| 5,630,223 A * | 5/1997 | Bahu | ............... | H01Q 3/2611 455/24 |
| 5,729,829 A * | 3/1998 | Talwar | ............... | H04B 1/525 455/296 |
| 6,507,728 B1 * | 1/2003 | Watanabe | ............... | H04B 1/126 455/126 |
| 9,191,050 B1 * | 11/2015 | Hwang | ............... | H04B 1/525 |
| 10,050,663 B1 * | 8/2018 | Ku | ............... | H04B 1/525 |
| 10,069,587 B1 * | 9/2018 | Rimini | ............... | H04L 25/0328 |
| 10,116,485 B1 * | 10/2018 | Liu | ............... | H04B 17/17 |
| 10,142,137 B2 * | 11/2018 | Luo | ............... | H04B 1/10 |
| 10,230,419 B2 | 3/2019 | Bharadia et al. | | |
| 2002/0193071 A1 * | 12/2002 | Waltho | ............... | H04B 1/525 455/24 |
| 2004/0176034 A1 * | 9/2004 | Hunter | ............... | H04B 1/525 455/63.1 |
| 2005/0069063 A1 | 3/2005 | Waltho et al. | | |
| 2006/0035601 A1 * | 2/2006 | Seo | ............... | H04B 1/40 455/78 |
| 2006/0240769 A1 * | 10/2006 | Proctor, Jr. | ............... | H04B 7/15585 455/24 |
| 2008/0012748 A1 * | 1/2008 | Ahn | ............... | H04B 17/21 342/21 |
| 2008/0242239 A1 * | 10/2008 | Wilson | ............... | H04B 1/0007 455/83 |
| 2009/0207896 A1 * | 8/2009 | Behzad | ............... | H04L 25/03343 375/221 |
| 2012/0009886 A1 | 1/2012 | Poulin | | |
| 2012/0295553 A1 | 11/2012 | Sahota | | |
| 2012/0302188 A1 | 11/2012 | Sahota et al. | | |
| 2013/0003617 A1 * | 1/2013 | Gudem | ............... | H04B 1/525 370/277 |
| 2013/0102254 A1 * | 4/2013 | Cyzs | ............... | H04B 1/525 455/63.1 |
| 2013/0225097 A1 * | 8/2013 | Hong | ............... | H04B 15/00 455/77 |
| 2015/0065064 A1 * | 3/2015 | Hwang | ............... | H04B 1/525 455/78 |
| 2015/0180423 A1 | 6/2015 | Sankaranarayanan | | |
| 2015/0280893 A1 * | 10/2015 | Choi | ............... | H04L 5/14 370/281 |
| 2016/0050031 A1 * | 2/2016 | Hwang | ............... | H04L 25/08 375/219 |
| 2016/0119018 A1 | 4/2016 | Lindgren et al. | | |
| 2016/0211882 A1 * | 7/2016 | Hwang | ............... | H04B 1/126 |
| 2016/0226653 A1 * | 8/2016 | Bharadia | ............... | H04B 1/525 |
| 2017/0104506 A1 * | 4/2017 | Liu | ............... | H04L 27/26 |
| 2017/0111155 A1 * | 4/2017 | Liu | ............... | H04L 5/0055 |
| 2017/0170948 A1 * | 6/2017 | Eltawil | ............... | H04B 1/525 |
| 2017/0179983 A1 * | 6/2017 | Choi | ............... | H04B 1/109 |
| 2017/0194992 A1 | 7/2017 | Kim et al. | | |
| 2017/0207812 A1 * | 7/2017 | Wyville | ............... | H04L 5/14 |
| 2017/0237547 A1 * | 8/2017 | Eltawil | ............... | H04L 5/1453 370/278 |
| 2017/0353212 A1 * | 12/2017 | Bharadia | ............... | H04L 5/1461 |
| 2018/0006794 A1 * | 1/2018 | Lee | ............... | H04B 1/525 |
| 2018/0205764 A1 * | 7/2018 | Jeon | ............... | H04W 88/10 |
| 2019/0081649 A1 * | 3/2019 | Khlat | ............... | H04B 1/1027 |
| 2019/0081767 A1 * | 3/2019 | Luo | ............... | H04B 7/026 |
| 2019/0207633 A1 * | 7/2019 | Huusari | ............... | H03H 7/48 |
| 2019/0245566 A1 * | 8/2019 | Luo | ............... | H04B 1/0475 |

FOREIGN PATENT DOCUMENTS

| | | |
|---|---|---|
| WO | 2009/066200 A2 | 5/2009 |
| WO | 2015/048678 A1 | 4/2015 |

* cited by examiner

ELECTRONIC DEVICE FOR ATTENUATING AT LEAST PART OF SIGNAL RECEIVED BY ANTENNA AND METHOD FOR CONTROLLING COMMUNICATION SIGNAL

CROSS-REFERENCE TO RELATED APPLICATION(S)

This application is based on and claims priority under 35 U.S.C. § 119 to Korean Patent Application No. 10-2018-0159295, filed on Dec. 11, 2018, in the Korean Intellectual Property Office, the disclosure of which is incorporated by reference herein in its entirety.

TECHNICAL FIELD

One or more disclosed embodiments generally relate to methods and apparatuses for controlling communication signals.

BACKGROUND

With the advancement of technologies, there has been an increase in the popularization of wireless communication-enabled electronic devices. In order to meet the increasing demand for wireless data traffic since the commercialization of $4^{th}$ generation (4G) communication systems, advanced $5^{th}$ generation (5G) or pre-5G communication systems are under development. This leads to the development of electronic devices that are capable of supporting both the 4G and 5G communication systems. For example, 5G networks may typically have data rates that are higher than 4G networks.

SUMMARY

An electronic device may be configured to support various communication systems operating in different frequency bands. In order to support such various communication systems (e.g., 4G communication and 5G communication systems), the electronic device may use more than one antenna and more than one front-end module.

If the electronic device is configured to receive and transmit signals of various communication systems using one antenna and one front-end module, such a configuration may cause an intermodulation distortion (IMD) leading to communication sensitivity performance degradation and spurious signals leading to reception performance degradation.

Meanwhile, if the electronic device is configured with multiple antennas and front-end modules that are equal in number to the communication systems that the electronic device supports, this may cause a problem in that power consumption may increase when isolating a particular antenna.

According to an embodiment of the disclosure, an electronic device is provided. The electronic device includes a first antenna, a second antenna, a first communication circuit configured to communicate in a first frequency band with the first antenna at a first data rate, a second communication circuit configured to communicate in a second frequency band with the second antenna at a second data rate higher than the first data rate, a first coupler electrically connected between the first antenna and the first communication circuit, and at least one control circuit configured to control to identify, during at least part of a period of simultaneously transmitting a first transmit signal with the first antenna and a second transmit signal with the second antenna, an amplitude of a first receive signal including at least part of the second transmit signal detected by the first coupler, disable an operation of attenuating the at least part of the second transmit signal included in the first receive signal based on the amplitude of the first receive signal falling in a first designated range, and enable the operation of attenuating the at least part of the second transmit signal included in the first receive signal based on the amplitude of the first receive signal falling in a second designated range.

According to an embodiment of the disclosure, a signal control method of an electronic device is provided. The method includes identifying, during at least part of a period of simultaneously transmitting a first transmit signal with a first antenna and a second transmit signal with a second antenna, an amplitude of a first receive signal including at least part of the second transmit signal detected by a first coupler, disabling an operation of attenuating the at least part of the second transmit signal included in the first receive signal based on the amplitude of the first receive signal falling in a first designated range, and enabling the operation of attenuating the at least part of the second transmit signal included in the first receive signal based on the amplitude of the first receive signal falling in a second designated range.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Certain disclosed embodiments aim to provide methods and electronic devices for controlling communication signals and that are capable of mitigating inter-communication system signal interference.

Figure 1:
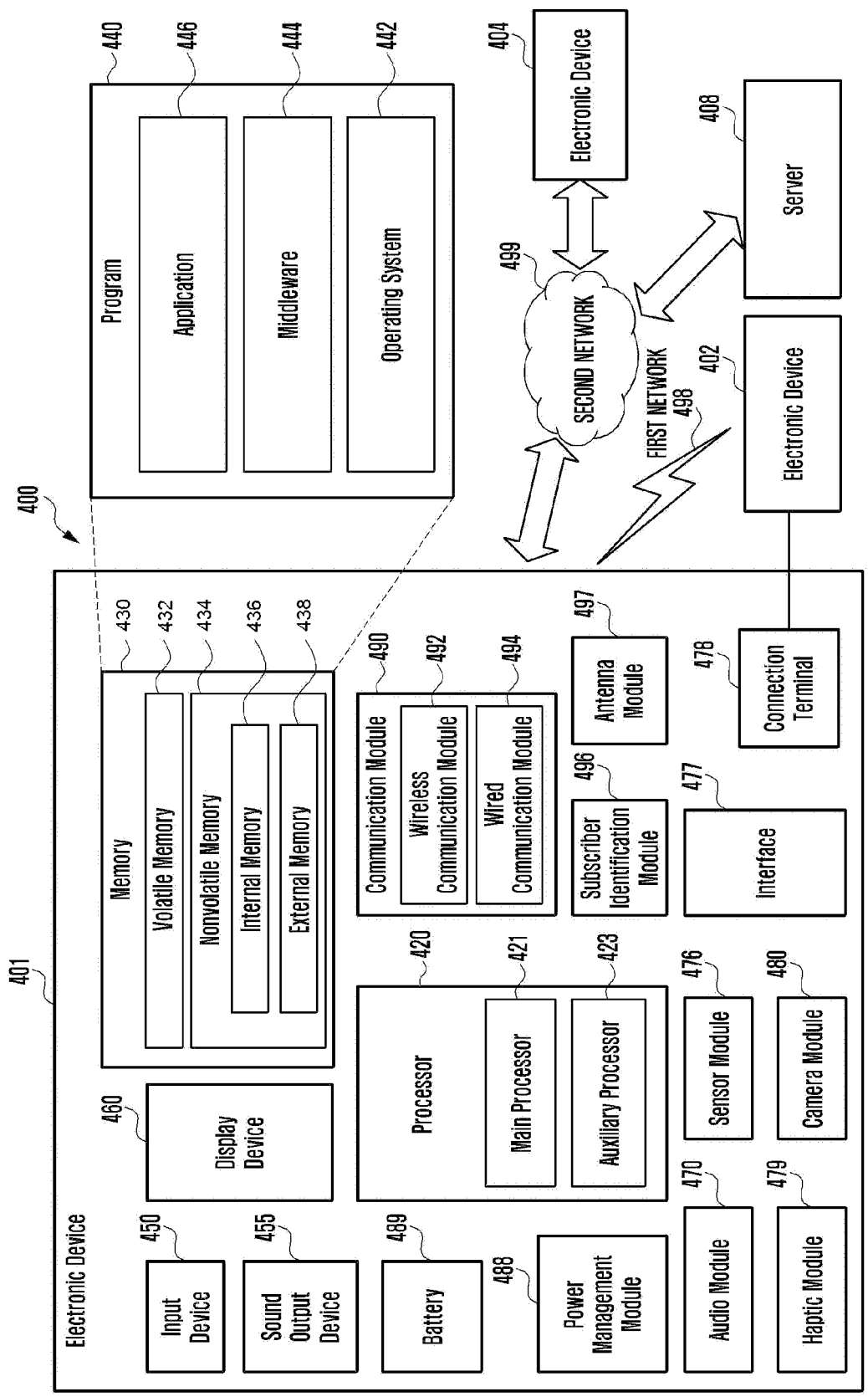
FIG. 1 is a block diagram illustrating a configuration of an electronic device in a network environment according to an embodiment.

FIG. 1 is a block diagram illustrating an electronic device 401 in a network environment 400 according to an embodiment. Referring to FIG. 1, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, a keyboard, or a digital pen (e.g., a stylus pen).

The sound output device 455 may output sound signals to the outside of the electronic device 401. The sound output device 455 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 402) directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., PCB). According to an embodiment, the antenna module 497 may include a plurality of antennas. In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
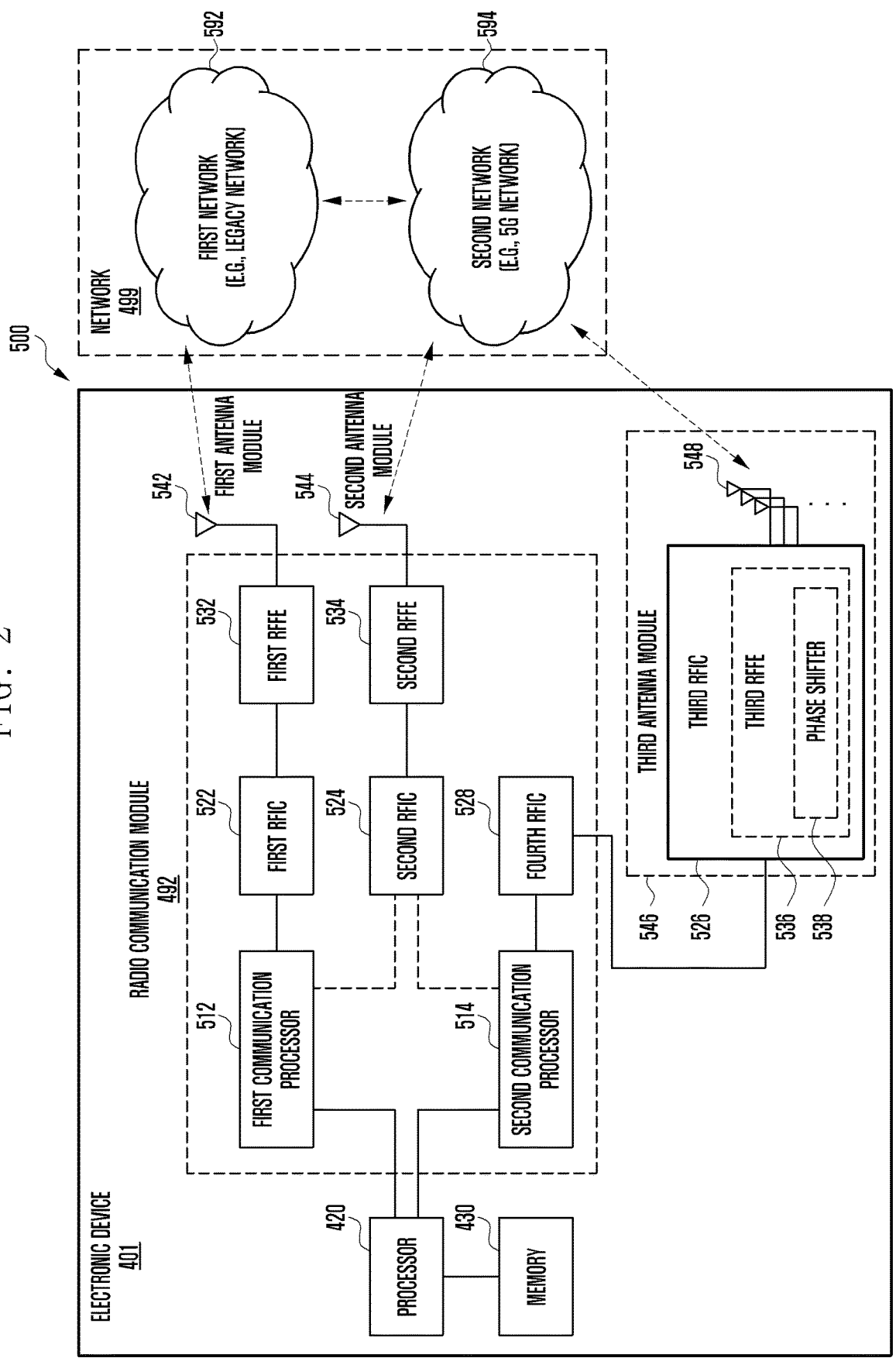
FIG. 2 is a block diagram illustrating a configuration of an electronic device for supporting legacy network communication and 5G network communication according to an embodiment.

FIG. 2 is a block diagram 500 illustrating a configuration of the electronic device 401 for supporting legacy network communication and 5G network communication according to an embodiment.

In reference to FIG. 2, the electronic device 401 may include a first communication processor 512, a second communication processor 514, a first radio frequency integrated circuit (RFIC) 522, a second RFIC 524, a third RFIC 526, a fourth RFIC 528, a first radio frequency front end (RFFE) 532, a second RFFE 534, a first antenna module 542, a second antenna module 544, and an antenna 548.

The electronic device 401 may further include the processor 420 and the memory 430. The network 499 may include a first network 592 and a second network 594. According to an alternative embodiment, the electronic device 401 may further include at least one of the components described with reference to FIG. 1, and the network 499 may further include at least one other network. According to an embodiment, the first communication processor 512, the second communication processor 514, the first RFIC 533, the second RFIC 524, the fourth RFIC 528, the first RFFE 532, and the second RFFE 534 may form at least part of a radio communication module 492. According to an alternative embodiment, the fourth RFIC 528 may be omitted or included as part of the third RFIC 526. The processor 420 and the first and second communication processors 512 and 514 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. 101.

The first communication processor 512 may establish a communication channel for use by performing radio communication with the first network 592 and support legacy network communication through the established communication channel.

According to an embodiment, the first network may be a legacy network such as a $2^{nd}$ generation (2G), a $3^{rd}$ generation (3D), or a 4G or long terminal evolution (LTE) network. The second communication processor 514 may establish a communication channel in a band (e.g., about 6 GHz to 60 GHz) designated within a band available for radio communication with the second network 594 and support 5G network communication through the established communication channel.

According to an embodiment, the second network 594 may be a 5G network defined by the $3^{rd}$ generation partnership project (3GPP). Additionally, according to an embodiment, the first communication processor 512 or the second communication processors 514 may establish a communication channel in a different band (e.g., below 6 GHz) designated within a band available for radio communication with the second network 594 and support 5G network communication through the established communication channel. According to an embodiment, the first and second communication processors 512 and 514 may be implemented in a single chip or a single package. According to an embodiment, the first and second communication processors 512 and 514 may be formed in a single chip or a single package along with the processor 420, the auxiliary processor 423, or the communication module 490.

To transmit data, the first RFIC 522 may convert a baseband signal generated by the first communication processor 512 to a radio frequency (RF) signal in a band ranging from about 700 MHz to about 3 GHz for use within the first network 592 (e.g., legacy network). To receive data, an RF signal may be received from the first network 592 (e.g., legacy network) through an antenna (e.g., first antenna module 542) and preprocessed by an RFFE (e.g., first RFFE 532). The first RFIC 522 may convert the preprocessed RF signal to a baseband signal that can be processed by the first communication processor 512.

To transmit data, the second RFIC 524 may convert a baseband signal generated by the first communication processor 512 or the second communication processor 514 to an RF signal of Sub6 band (e.g., below 6 GHz) for use within the second network 594 (e.g., 5G network) (hereinafter, referred to as 5G Sub6 RF signal). To receive data, a 5G Sub6 RF signal may be received from the second network 594 (e.g., 5G network) through an antenna (e.g., second antenna module 544) and preprocessed by an RFFE (e.g., second RFFE 534). The second RFIC 524 may convert the preprocessed 5G Sub6 RF signal to a baseband signal that can be processed by the corresponding communication processor, i.e., one of the first and second communication processors 512 and 514.

To transmit data, the third RFIC 526 may convert a baseband signal generated by the second communication processor 514 to an RF signal of a 5G Above6 band (e.g., about 6 GHz to about 60 GHz) for use within the second network 594 (e.g., 5G network) (hereinafter, referred to as 5G Above6 RF signal). To receive data, a 5G Above6 RF signal may be received from the second network 549 (e.g., 5G network) through an antenna (e.g., antenna 548) and pre-processed by the third RFFE 536. The third RFIC 526 may convert the preprocessed 5G Above6 RF signal to a baseband signal that can be processed by the second communication processor 514. According to an embodiment, the third RFFE 536 may be formed as part of the third RFIC 526.

According to an embodiment, the electronic device 401 may include the fourth RFIC 528 either separately from or as at least part of the third RFIC 526. In this case, for transmission of data, the fourth RFIC 528 may convert a baseband signal generated by the second communication processor 514 to an RF signal of an intermediate frequency band (e.g., about 9 GHz to about 11 GHz) (hereinafter, referred to as IF signal) and send the IF signal to the third RFIC 526. The third RFIC 526 may convert the IF signal to a 5G Above6 RF signal. To receive data, a 5G Above6 RF signal may be received from the second network 594 (e.g., 5G network) through an antenna (e.g., antenna 548) and converted to an IF signal by the third RFIC 526. The fourth RFIC 528 may convert the IF signal to a baseband signal that can be processed by the second communication processor 514.

According to an embodiment, the first and second RFICs 522 and 524 may be implemented as at least part of a single chip or single package. According to an embodiment, the first and second RFFEs 532 and 534 may be implemented as at least part of a signal chip or single package. According to an embodiment at least one of the first and second antenna modules 542 and 544 may be omitted or combined with another antenna module so as to process RF signals in the corresponding bands.

According to an embodiment, the third RFIC 526 and the antenna 548 may be arranged on the same substrate to form the third antenna module 546. For example, the radio communication module 492 or the processor 420 may be arranged on a first substrate (e.g., main PCB). In this case, the third antenna module 546 may be formed such that the third RFIC 526 is disposed in a region (e.g., bottom surface) of a second substrate (e.g., sub PCB) and the antenna 548 is disposed in a different region (e.g., top surface) of the second substrate. The second substrate (e.g., sub PCB) may be separate from the first substrate. Arranging the third RFIC 526 and the antenna 548 on the same substrate makes it possible to shorten the length of a transmission line therebetween. For example, this may reduce high frequency (e.g., about 6 GHz to about 60 GHz) signal loss (e.g., attenuation) on the transmission line. Accordingly, the electronic device 401 may improve the quality or speed of communication with the second network 594 (e.g., 5G network).

According to an embodiment, the antenna 548 may be implemented as an array antenna including multiple antenna elements. In this case, the third RFIC 526 may include multiple phase shifters 538, as part of the third RFFE 536 by way of example, corresponding to the multiple antenna elements. To transmit data, the multiple phase shifters 538 may perform phase shift on 5G Above6 RF signals so that they can be transmitted from the electronic device 401 through the corresponding antenna elements. As an example, the electronic device 401 may be a 5G network base station. To receive data, the multiple phase shifters 538 may perform phase shift on the 5G Above6 RF signals received from the second network 594 through the corresponding antenna elements such that the signals are identical or substantially in phase. This makes it possible to perform beamforming for communication between the electronic device 401 and the second network 594.

The second network 594 (e.g., 5G network) may operate independently from (e.g., in a standalone (SA) mode) or in association with (e.g., non-standalone (NSA) mode) the first network 592 (e.g., legacy network). For example, the 5G network may include only access networks (e.g., 5G radio access network (RAN) or next generation RAN (NG RAN) with the exclusion of a core network (e.g., next generation core (NGC)). In this case, the electronic device 401 may access the access network of the 5G network and connect to an external network (e.g., Internet) under the control of the core network (e.g., evolved packet core (EPC)) of the legacy network. Protocol information (e.g., LTE protocol information) for communication with the legacy network or protocol information (e.g., New Radio (NR) protocol information) for communication with the 5G network may be stored in the memory 430 so as to be accessed by other components (e.g., processor 420, first communication processor 512, and second communication processor 514).

Figure 3:
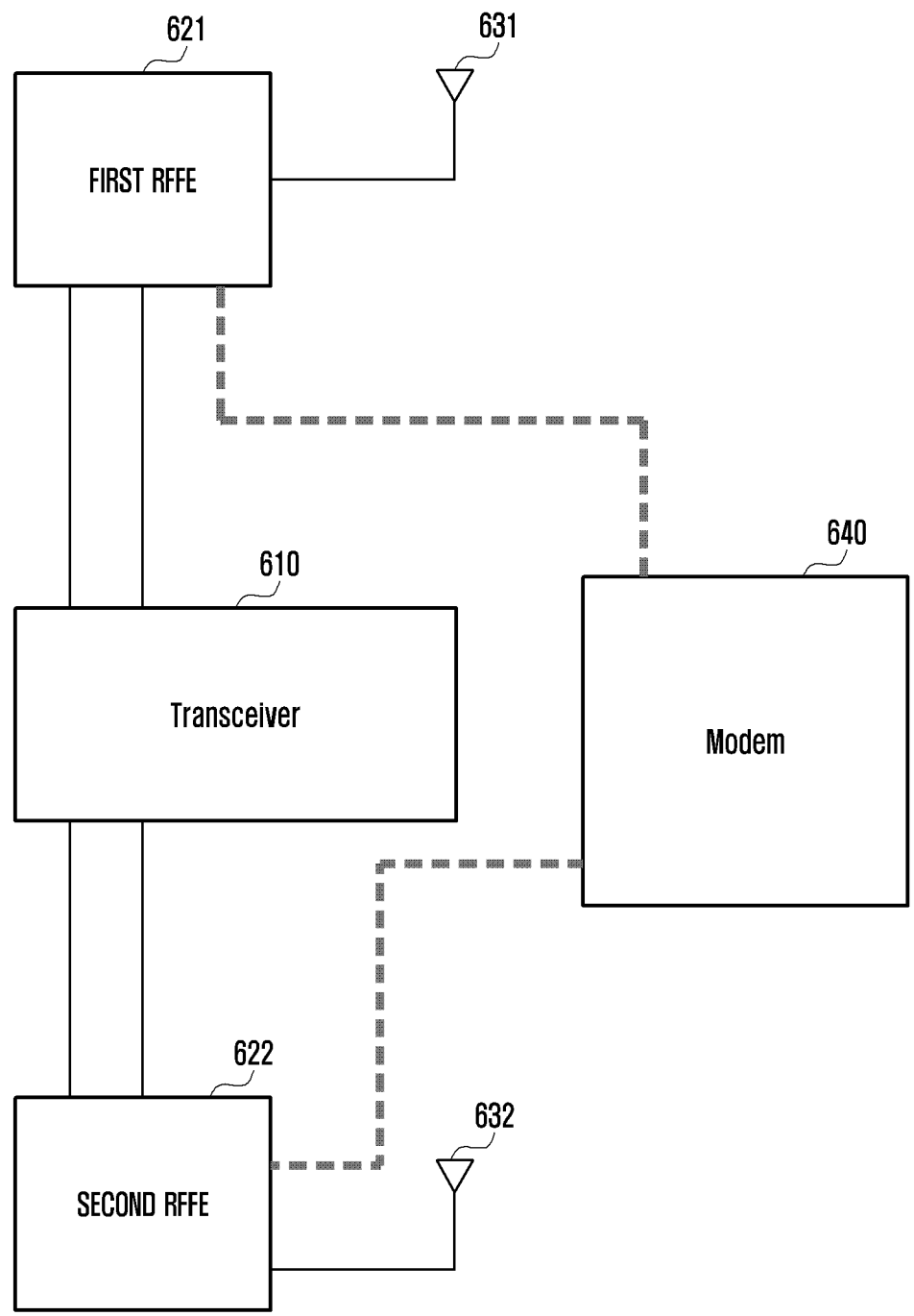
FIG. 3 is a block diagram illustrating a configuration of an electronic device for supporting legacy network communication and 5G network communication according to an embodiment.

FIG. 3 is a block diagram illustrating a configuration of an electronic device 401 for supporting legacy network communication and 5G network communication according to an embodiment of the disclosure.

The electronic device 401 may include a modem 640 (e.g., one of the first communication processor 512, the second communication processor 514, and the processor 420 in FIG. 2), a transceiver 610 (e.g., one or more of the first RFIC 522, the second RFIC 524, the third RFIC 526, and the fourth RFIC 528 in FIG. 2), a first RFFE 621 (e.g., one of the first RFFE 532 and the second RFFE 534 in FIG. 2), a second RFFE 622 (e.g., one of the first RFFE 532 and the second RFFE 534 in FIG. 2), a first antenna module 631 (e.g., one of the first antenna module 542, the second antenna module 544, and the antenna 548 in FIG. 2), and a second antenna module 632 (e.g., one of the first antenna module 542, the second antenna module 544, and the antenna 548 in FIG. 2).

According to an embodiment, the modem 640, the transceiver 610, the first RFFE 621, and the second RFFE 622 may form at least part of the radio communication module 492.

The transceiver 610 may establish a communication channel in a band for use for radio communication with the first network 592 or the second network 594 of FIG. 2 and support legacy network and 5G network communication through the established communication channel.

According to an embodiment, the transceiver 610 may be implemented in a single chip or a single package. According to an embodiment, the transceiver 610 may be formed in a signal chip or a single package along with the auxiliary processor 423 or the communication module 490.

To transmit data, the transceiver 610 may convert a baseband signal generated by the modem 640 to an RF signal in a band ranging from about 700 MHz to 3 GHz for use by the first network (e.g., the first network 592 in FIG. 2 (e.g., legacy network)). Alternatively, to transmit data, the transceiver 610 may convert a baseband signal generated by the modem 640 to an RF signal (e.g., below 6 GHz) for use by the second network 594 (e.g., 5G network).

To receive data, the transceiver 610 may receive an RF signal from the first network (e.g., the first network 592 in FIG. 2 or the legacy network) or the second network (e.g., the second network 594 in FIG. 2 or the 5G network) by means of the antenna (e.g., the first antenna module 631 or second antenna module 632) and preprocess the received RF signal by means of the RFFE (e.g., the first RFFE 621 and second RFFE 622). The transceiver 610 may convert the preprocessed RF signal to a baseband signal that can be processed by the modem 640.

According to an embodiment, the first and second RFFEs 621 and 622 may be implemented as at least part of a single chip or a single package. According to an embodiment, at least one of the first and second antenna modules 631 and 632 may be omitted or combined with one other antenna module to process RF signals in the corresponding bands.

According to an embodiment, the first and second RFFEs 621 and 622 may include a coupler that is capable of detecting a signal component of a first network (e.g., the first network 592 in FIG. 2 or the legacy network) or a second network (e.g. the second network 594 in FIG. 2 or the 5G network).

According to an embodiment, the first and second RFFEs 621 and 622 may include at least one of a tunable filter, a phase shifter, and an amplifier that are capable of attenuating a detected signal component, if the first and second RFFEs 621 and 622 detect a signal component of the first network (e.g., the first network 592 in FIG. 2 (e.g., legacy network)) or the second network (e.g. the second network 594 in FIG. 2 (e.g., (5G network)).

According to an embodiment, the at least one of the tunable filter, the phase shifter, and the amplifier that are included in the first and second RFFEs 621 and 622 may be capable of attenuating the detected signal component under the control of the modem 640 (e.g., the processor 420, the first communication processor 512, and the second communication processor 514).

Figure 4:
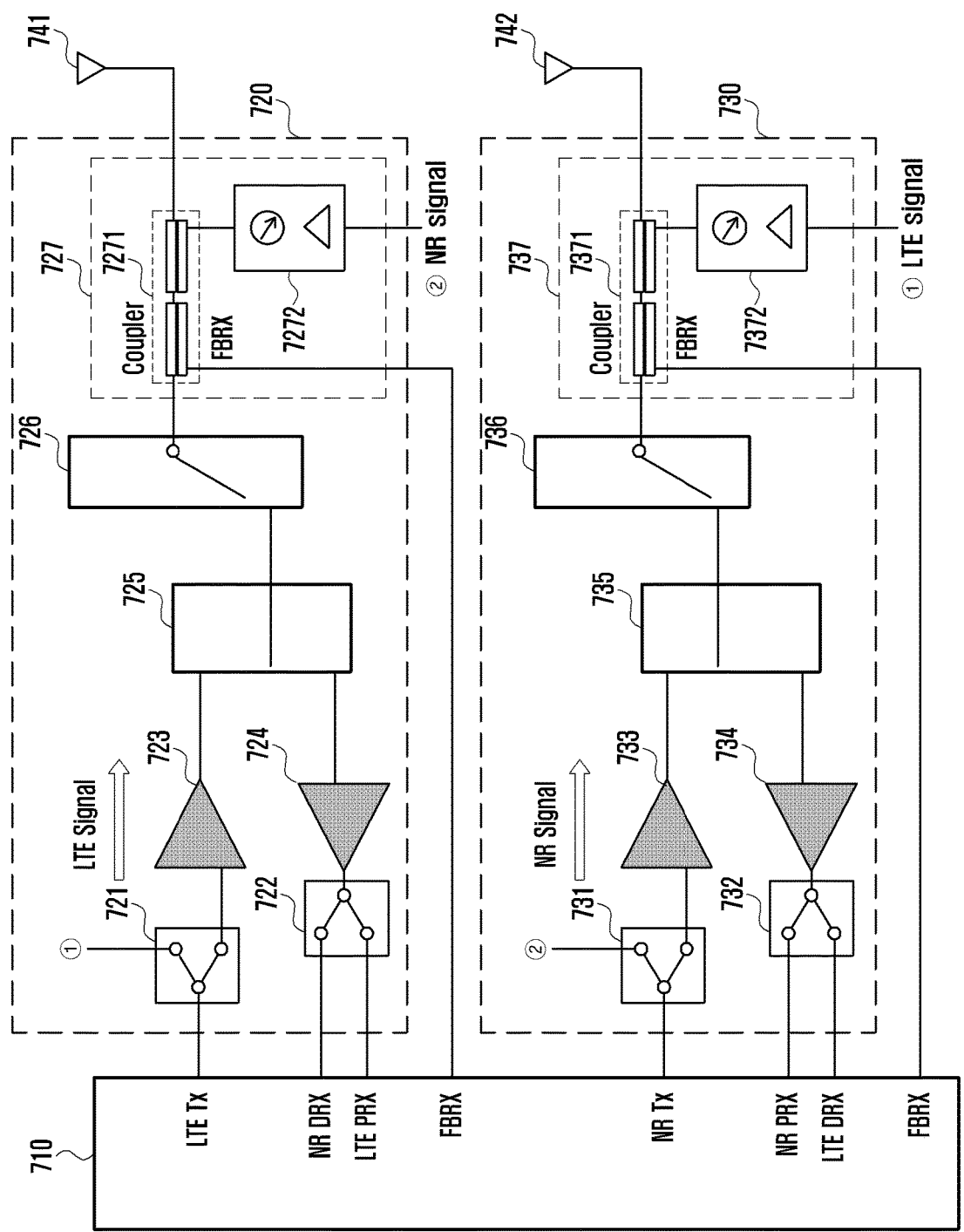
FIG. 4 is a circuit diagram illustrating a configuration of an electronic device equipped with a front-end module including a phase shifter for supporting legacy network communication and 5G network communication according to an embodiment.

FIG. 4 is a circuit diagram illustrating a configuration of an electronic device 401 equipped with a front-end module including a phase shifter for supporting legacy network communication and 5G network communication according to an embodiment of the disclosure.

According to an embodiment, the electronic device 401 may include a transceiver 710 (e.g., the transceiver 610 in FIG. 3), a first RFFE 720, a second RFFE 730, a first antenna module 741, and a second antenna module 742.

According to an embodiment, the transceiver 710 may transmit and receive a first network (e.g., legacy network) transmit signal (LTE Tx), a first network primary receive signal (LTE primary receive signal (PRx)), a first network diversity receive signal (LTE diversity receive signal (DRx)), a second network (e.g., 5G network) transmit signal (NR Tx), a second network primary receive signal (NR primary receive signal (PRx)), a second network diversity receive signal (NR diversity receive signal (DRx)), and a feedback receive signal (FBRx).

According to an embodiment, the transceiver 710 may include signal terminals for transmitting and receiving the first network (e.g., legacy network) transmit signal (LTE Tx), the first network (e.g., legacy network) primary receive signal (LTE primary receive signal (PRx)), the first network (e.g., legacy network) diversity receive signal (LTE diversity receive signal (DRx)), the second network (e.g., 5G network) transmit signal (NR Tx), the second network (e.g., 5G network) primary receive signal (NR primary receive signal (PRx)), the second network (e.g., 5G network) diversity receive signal (NR diversity receive signal (DRx)), and the feedback receive signal (FBRx).

According to an embodiment, the first RFFE 720 may receive the first network (e.g., legacy network) transmit signal (LTE Tx) and send it to the first antenna module 741. The first RFFE 720 may receive the second network (e.g., 5G network) diversity receive signal (NR DRx) or the first network (e.g., legacy network) primary receive signal (LTE PRx) through the first antenna module 741 and send it to the transceiver 710.

According to an embodiment, the second RFFE 730 may receive the second network (e.g., 5G network) transmit signal (NR Tx) and send it to the second antenna module 742. The second RFFE 730 may receive the first network (e.g., legacy network) diversity receive signal (LTE DRx) or the second network (e.g., 5G network) primary receive signal (NR PRx) through the second antenna module 742 and send it to the transceiver 710.

According to an embodiment, the first RFFE 720 may send at least part of the first network (e.g., legacy network) transmit signal (LTE Tx) received from the transceiver 710 to the second RFFE 730.

According to an embodiment, the second RFFE 730 may send at least part of the second network (e.g., 5G network) transmit signal (NR Tx) received from the transceiver 710 to the first RFFE 720.

According to an embodiment, the first RFFE 720 may receive at least part of the second network (e.g., 5G network) transmit signal (NR Tx) radiated by the second antenna 742.

According to an embodiment, the second RFFE 730 may receive at least part of the first network (e.g., legacy network) transmit signal (LTE Tx) from the first RFFE 720.

According to an embodiment, in the case where the electronic device 401 is simultaneously using the first network (e.g., legacy network) and the second network (e.g., 5G network), the first RFFE 720 may receive the first network (e.g., legacy network) primary receive signal (LTE PRx) through the first antenna module 741. In this case, the received first network (e.g., legacy network) primary receive signal (LTE PRx) may include at least part of the second network (e.g., 5G network) transmit signal (NR Tx).

According to an embodiment, in the case where the electronic device 401 is simultaneously using the first network (e.g., legacy network) and the second network (e.g., 5G network), if an amplitude (e.g., signal strength) of the first network (e.g., legacy network) primary receive signal (LTE PRx) falls in a first designated range, the transceiver 710 may control the first RFFE 720 to disable the operation of attenuating the second network (e.g., 5G network) transmit signal (NR Tx) included in the received first network (e.g., legacy network) primary receive signal (LTE PRx).

According to an embodiment, in the case where the electronic device 401 is simultaneously using the first network (e.g., legacy network) and the second network (e.g., 5G network), if the amplitude (e.g., signal strength) of the first network (e.g., legacy network) primary receive signal (LTE PRx) falls in a second designated range, the transceiver 710 may control the first RFFE 720 to enable the operation of attenuating the second network (e.g., 5G network) transmit signal (NR Tx) included in the received first network (e.g., legacy network) primary receive signal (LTE PRx) based on the second network (e.g., 5G network) transmit signal (NR Tx) received from the second RFFE 730. The first designated range may be less in signal strength coverage than the second designated range.

According to an embodiment, in the case where the electronic device 401 is simultaneously using the first network (e.g., legacy network) and second network (e.g., 5G network), if the amplitude (e.g. signal strength) of the received first network (e.g., legacy network) primary receive signal (LTE PRx) is equal to or greater than a second designated range, the first RFFE 720 may identify the amplitude of the received first network (e.g., legacy network) primary receive signal (LTE PRx).

According to an embodiment, in the case where the electronic device 401 is simultaneously using the first network (e.g., legacy network) and second network (e.g., 5G network), if the amplitude (e.g. signal strength) of the received first network (e.g., legacy network) primary receive signal (LTE PRx) falls in a second designated range, the first RFFE 720 may attenuate the second network (e.g., 5G network) transmit signal (NR Tx) included in the first network (e.g., legacy network) primary receive signal (LTE PRx) based on the second network (e.g., 5G network) transmit signal (NR Tx) received from the second RFFE 730.

According to an embodiment, the first RFFE 720 may perform phase shift on the second network (e.g., 5G network) transmit signal (NR Tx) received from the second RFFE 730 to generate an anti-phase signal of the second network (e.g., 5G network) transmit signal (NR Tx). The first RFFE 720 may attenuate the second network (e.g., 5G network) transmit signal (NR Tx) included in the first network (e.g., legacy network) primary receive signal (LTE PRx) based on the generated anti-phase signal of the second network (e.g., 5G network) transmit signal (NR Tx).

According to an embodiment, in the case where the electronic device 401 is simultaneously using the first network (e.g., legacy network) and second network (e.g., 5G network), the second RFFE 730 may receive a second network (e.g., 5G network) primary receive signal (NR PRx) through the second antenna module 742. In this case, the second network (e.g., 5G network) primary receive signal (NR PRx) may include a first network (e.g., legacy network) transmit signal (LTE Tx).

According to an embodiment, in the case where the electronic device 401 is simultaneously using the first network (e.g., legacy network) and second network (e.g., 5G network), if an amplitude (e.g., signal strength) of the received second network (e.g., 5G network) primary receive signal (NR PRx) falls in a third designated range, the transceiver 710 may disable the operation of attenuating the first network (e.g., legacy network) transmit signal (LTE Tx) included in the received second network (e.g., 5G network) primary receive signal (NR PRx).

According to an embodiment, in the case where the electronic device 401 is simultaneously using the first network (e.g., legacy network) and second network (e.g., 5G network), if the amplitude (e.g., signal strength) of the received second network (e.g., 5G network) primary receive signal (NR PRx) falls in a fourth designated range, the transceiver 710 may control the second RFFE 730 to enable the operation of attenuating the first network (e.g., legacy network) transmit signal (LTE Tx) included in the received second network (e.g., 5G network) primary receive signal (NR PRx) based on the first network (e.g., legacy network) transmit signal (LTE Tx) received from the first RFFE 720. The third range may be less in signal strength coverage that the fourth designated range.

According to an embodiment, in the case where the electronic device 401 is simultaneously using the first network (e.g., legacy network) and second network (e.g., 5G network), if the amplitude of the received second network (e.g., 5G network) primary receive signal (NR PRx) is equal to or greater than the fourth designated range, the second RFFE 730 may identify the amplitude of the received second network (e.g., 5G network) primary receive signal (NR PRx).

According to an embodiment, in the case where the electronic device 401 is simultaneously using the first network (e.g., legacy network) and second network (e.g., 5G network), if the amplitude of the received second network (e.g., 5G network) primary receive signal (NR PRx) falls in the fourth designated range, the second RFFE 730 may attenuate the first network (e.g., legacy network) transmit signal (LTE Tx) included in the received second network (e.g., 5G network) primary receive signal (NR PRx) based on the first network (e.g., legacy network) transmit signal (LTE Tx) received from the first RFFE 720.

According to an embodiment, the second RFFE 730 may perform phase shift on the first network (e.g., legacy network) transmit signal (LTE Tx) received from the first RFFE 720 to generate an anti-phase signal of the first network (e.g., legacy network) transmit signal (LTE Tx). The second RFFE 730 may attenuate the first network (e.g., legacy network) transmit signal (LTE Tx) included in the received second network (e.g., 5G network) primary receive signal (NR PRx) based on the generated anti-phase signal of the first network (e.g., legacy network) transmit signal (LTE Tx).

According to an embodiment, the first RFFE 720 may include a first transmit signal splitter 721, a first receive signal splitter 722, a first transmit signal amplifier 723, a first receive signal amplifier 724, a first duplexer 725, a first antenna switch module 726, and a first coupler module 727.

According to an embodiment, the first transmit signal splitter 721 may split the first network (e.g., legacy network) transmit signal (LTE Tx) to send the first network (e.g., legacy network) transmit signal (LTE Tx) to the first transmit signal amplifier 723 and the second RFFE 730.

According to an embodiment, the first transmit signal splitter 721 may split the first network (e.g., legacy network) transmit signal (LTE Tx) to send the first network (e.g., legacy network) transmit signal (LTE Tx) to the first transmit signal amplifier 723 and the second coupler module 737.

According to an embodiment, the first coupler module 727 and the second coupler module 737 may extract part of a signal pathing therethrough. The extracted signal may be sent to the transceiver 710.

According to an embodiment, the first transmit signal amplifier 723 may amplify the first network (e.g., legacy network) transmit signal (LTE Tx) and send the amplified first network (e.g., legacy network) transmit signal (LTE Tx) to the first duplexer 725.

According to an embodiment, the first duplexer 725 may send the amplified first network (e.g., legacy network) transmit signal (LTE Tx) to the first antenna switch module 726.

According to an embodiment, the first antenna switch module 726 may send the amplified first network (e.g., legacy network) transmit signal (LTE Tx) to the first coupler module 727.

According to an embodiment, the first coupler module 727 may send the amplified first network (e.g., legacy network) transmit signal (LTE Tx) to the first antenna module 741.

According to an embodiment, the first coupler 727 may use the amplified first network (e.g., legacy network) transmit signal (LTE Tx) as a feedback receive signal (FBRx).

According to an embodiment, the first coupler module 727 may include at least one coupler 7271 and at least one phase shifter 7272.

According to an embodiment, the at least one coupler 7271 may be connected between the first antenna switch module 726 and the first antenna module 741.

According to an embodiment, the first antenna switch module 726 may be connected to a coupler module responsible for a different frequency band.

According to an embodiment, the at least one coupler 7271 of the first coupler module 727 may be connected between the first duplexer 725 and the first antenna module 741.

According to an embodiment, the phase shifter 7272 of the first coupler module 727 may be connected to the at least one coupler 7271 and the first antenna module 741.

According to an embodiment, the first antenna module 741 may radiate the amplified first network (e.g., legacy network) transmit signal (LTE Tx).

According to an embodiment, the first antenna module 741 may receive a first network (e.g., legacy network) primary receive signal (LTE PRx) and a second network (e.g., 5G network) diversity receive signal (NR DRx) and send them to the first coupler 727.

According to an embodiment, if the first network (e.g., legacy network) primary receive signal (LTE PRx) received from the first antenna module 741 falls in a first designated range, the transceiver 710 may control the first coupler module 727 to disable the operation of attenuating the second network (e.g., 5G network) transmit signal (NR Tx) included in the first network (e.g., legacy network) primary receive signal (LTE PRx) based on the second network (e.g., 5G network) transmit signal (NR Tx) received from the second RFFE 730.

According to an embodiment, if the first network (e.g., legacy network) primary receive signal (LTE PRx) received from the antenna module 741 falls in a second designated range, the transceiver 710 may control the first coupler module 727 to activate the operation of attenuating the second network (e.g., 5G network) transmit signal (NR Tx) included in the first network (e.g., legacy network) primary receive signal (LTE PRx) based on the second network (e.g., 5G network) transmit signal (NR Tx) received from the second RFFE 730.

According to an embodiment, the first coupler module 727 may extract at least part of the first network (e.g., legacy network) primary receive signal (LTE PRx) received from the first antenna module 741 and send it to the transceiver 710 through a feedback receive signal (FBRx) terminal. The transceiver 710 may identify the amplitude of the first network (e.g., legacy network) primary receive signal (LTE PRx) based on the at least part of the first network (e.g., legacy network) primary receive signal (LTE PRx) received through the feedback receive signal (FBRX) terminal. The transceiver 710 may identify, if the first network (e.g., legacy network) primary receive signal (LTE PRx) received from the first antenna module 741 is equal to or greater than the second designated range, the amplitude of the first network (e.g., legacy network) primary receive signal (LTE PRx) received from the second RFFE 730.

According to an embodiment, if the first network (e.g., legacy network) primary receive signal (LTE PRx) received from the first antenna module 741 falls in the second designated range, the first coupler module 727 may perform phase shift on the second network (e.g., 5G network) transmit signal (NR Tx) received from the second RFFE 730 to attenuate the second network (e.g., 5G network) transmit signal (NR Tx) included in the first network (e.g., legacy network) primary receive signal (LTE PRx).

According to an embodiment, if the received first network (e.g., legacy network) primary receive signal (LTE PRx) falls in the first designated range, the transceiver 710 may control the phase shifter 7272 to deactivate the operation of attenuating the second network (e.g., 5G network) transmit signal (NR Tx) included in the first network (e.g., legacy network) primary receive signal (LTE PRx) based on the second network (e.g., 5G network) transmit signal (NR Tx) received from the RFFE 730.

According to an embodiment, if the received first network (e.g., legacy network) primary receive signal (LTE PRx) falls in the second designated range, the transceiver 710 may control the phase shifter 7272 to enable the operation of attenuating the second network (e.g., 5G network) transmit signal (NR Tx) included in the first network (e.g., legacy network) primary receive signal (LTE PRx) based on the second network (e.g., 5G network) transmit signal (NR Tx) received from the second RFFE 730. The first designated range may be less in signal strength coverage than the second designated range.

According to an embodiment, the transceiver 710 or modem (e.g., modem 640) may receive a feedback receive signal (FBRx) from the first coupler module 727 to determine whether the amplitude or signal strength of the received first network (e.g., legacy network) primary receive signal (LTE PRx) falls in a designated range.

According to an embodiment, the phase shifter 7272 may perform phase shift on the second network (e.g., 5G network) transmit signal (NR Tx) received from the second RFFE 730. The first coupler module 727 may attenuate the second network (e.g., 5G network) transmit signal (NR Tx) included in the first network (e.g., legacy network) primary receive signal (LTE PRx) based on the phase-shifted second network (e.g., 5G network) transmit signal (NR Tx).

According to an embodiment, the phase shifter 7272 may include an amplifier for amplifying the second network (e.g., 5G network) transmit signal (NR Tx) received from the second RFFE 730 and a phase shift device for generating an anti-phase signal of the amplified second network (e.g., 5G network) transmit signal (NR Tx).

According to an embodiment, the first coupler module 727 may send a first network (e.g., legacy network) primary receive signal (LTE PRx) and a second network (e.g., 5G network) diversity receive signal (NR DRx) to the first antenna switch module 726. In this case, if the received first network (e.g., legacy network) primary receive signal (LTE PRx) falls in the second designated range, the first coupler module 727 may remove the second network (e.g., 5G network) transmit signal (NR Tx) included in the first network (e.g., legacy network) primary receive signal (LTE PRx) and send the first network (e.g., legacy network) primary receive signal (LTE PRx) to the first antenna switch module 726. The first designated range may be less in signal strength coverage than the second designated range.

According to an embodiment, the first antenna switch module 726 may send the first network (e.g., legacy network) primary receive signal (LTE PRx) and the second network (e.g., 5G network) diversity receive signal (NR DRx) to the first duplex 725.

According to an embodiment, the first duplexer 725 may send the first network (e.g., legacy network) primary receive signal (LTE PRx) and the second network (e.g., 5G network) diversity receive signal (NR DRx) to the first receive signal amplifier 724.

According to an embodiment, the first receive signal amplifier 724 may send the amplified first network (e.g., legacy network) primary receive signal (LTE PRx) and second network (e.g., 5G network) diversity receive signal (NR DRx) to the first receive signal splitter 722.

According to an embodiment, the first receive signal splitter 722 may send the amplified first network (e.g., legacy network) primary receive signal (LTE PRx) and second network (e.g., 5G network) diversity receive signal (NR DRx) to the transceiver 710.

According to an embodiment, the second RFFE 730 may include a second transmit signal (Tx) splitter 731, a second receive signal (Rx) splitter (732), a second transmit signal amplifier 733, a second receiver amplifier 734, a second duplexer 735, a second antenna switch module 736, and a second coupler module 737.

According to an embodiment, the second transmit signal splitter 731 may split a second network (e.g., 5G network) transmit signal (NR Tx) and send the second network (e.g., 5G network) transmit signal (NR Tx) to the second transmit power amplifier 733 and the first RFFE 720.

According to an embodiment, the second transmit signal splitter 731 may split the second network (e.g., 5G network) transmit signal (NR Tx) and send the second network (e.g., 5G network) transmit signal (NR Tx) to the second transmit signal amplifier 733 and the first coupler module 727.

According to an embodiment, the second transmit signal amplifier 733 may amplify the second network (e.g., 5G network) transmit signal (NR Tx) and send the amplified second network (e.g., 5G network) transmit signal (NR Tx) to the second duplex 735.

According to an embodiment, the second duplexer 735 may send the amplified second network (e.g., 5G network) transmit signal (NR Tx) to the second antenna switch module 736.

According to an embodiment, the second antenna switch module 736 may send the amplified second network (e.g., 5G network) transmit signal (NR Tx) to the second coupler module 737.

According to an embodiment, the second coupler module 737 may send the amplified second network (e.g., 5G network) transmit signal (NR Tx) to the second antenna module 742.

According to an embodiment, the second coupler module 737 may use a signal acquired or extracted from the amplified second network (e.g., 5G network) transmit signal (NR Tx) as a feedback receive signal (FBRx).

According to an embodiment, the second coupler module 737 may include at least one coupler 7371 and at least one phase shifter 7372.

According to an embodiment, the at least one coupler 7371 of the second coupler module 737 may be connected between the second antenna switch module 736 and the second antenna module 742.

According to an embodiment, the second antenna switch module 736 may be connected to a coupler module responsible for a different frequency band.

According to an embodiment, the at least one coupler 7371 of the second coupler module 737 may be connected between the second duplexer 735 and the second antenna module 742.

According to an embodiment, the phase shifter 7372 of the second coupler module 737 may be connected to the at least one coupler 7371 and the second antenna module 742.

According to an embodiment, the second antenna module 742 may radiate an amplified second network (e.g., 5G network) transmit signal (NR Tx).

According to an embodiment, the second antenna module 742 may receive a second network (e.g., 5G network) primary receive signal (NR PRx) and a first network (e.g., legacy network) diversity receive signal (LTE DRx) and send them to the second coupler module 737.

According to an embodiment, if the second network (e.g., 5G network) primary receive signal (NR PRx) received from the second antenna module 742 falls in a third designated range, the transceiver 710 may control the second coupler module 737 to disable the operation of attenuating the first network (e.g., legacy network) transmit signal (LTE Tx) included in the second network (e.g., 5G network) primary receive signal (NR PRx).

According to an embodiment, if the second network (e.g., 5G network) primary receive signal (NR PRx) received from the second antenna module 742 falls in a fourth designated range, the transceiver may control the second coupler module 737 to enable the operation of attenuating the first network (e.g., legacy network) transmit signal (LTE Tx) included in the second network (e.g., 5G network) primary receive signal (NR PRx). The third designated range may be less in signal strength coverage than the fourth designated range.

According to an embodiment, the second coupler module 737 may extract at least part of the second network (e.g., 5G network) primary receive signal (NR PRx) received from the second antenna module 742 and send it to the transceiver 710 through a feedback receive signal (FBRx) terminal. The transceiver 710 may identify the amplitude of the second network (e.g., 5G network) primary receive signal (NR PRx) based on the at least part of the second network (e.g., 5G network) primary receive signal (NR PRx) that is received through the feedback receive signal (FBRx) terminal. The transceiver 710 may identify, if the second network (e.g., 5G network) primary receive signal (NR PRx) received from the second antenna module 742 is equal to or greater than the fourth designated range, the amplitude of the received second network (e.g., 5G network) primary receive signal (NR PRx).

According to an embodiment, if the second network (e.g., 5G network) primary receive signal (NR PRx) received from the second antenna module 742 falls in the fourth designated range, the second coupler module 737 may perform phase shift on the first network (e.g., legacy network) transmit signal (LTE Tx) received from the first RFFE 720 to attenuate the first network (e.g., legacy network) transmit signal (LTE Tx) included in the second network (e.g., 5G network) primary receive signal (NR PRx).

According to an embodiment, if the received second network (e.g., 5G network) primary receive signal (NR PRx) falls in the third designated range, the transceiver 710 may control the phase shifter 7372 to disable the operation of attenuating the first network (e.g., legacy network) transmit signal (LTE Tx) included in the second network (e.g., 5G network) primary receive signal (NR PRx).

According to an embodiment, if the received second network (e.g., 5G network) primary receive signal (NR PRx) falls in the fourth designated range, the transceiver 710 may control the phase shifter 7372 to enable the operation of attenuating the first network (e.g., legacy network) transmit signal (LTE Tx) included in the second network (e.g., 5G network) primary receive signal (NR PRx).

According to an embodiment, if the received second network (e.g., 5G network) primary receive signal (NR PRx) falls in the fourth designated range, the phase shifter 7372 may perform phase shift on the first network (e.g., legacy network) transmit signal (LTE Tx) received from the first RFFE 720. The second coupler module 737 may attenuate the first network (e.g., legacy network) transmit signal (LTE Tx) included in the second network (e.g., 5G network) primary receive signal (NR PRx) based on the phase-shifted first network (e.g., legacy network) transmit signal (LTE Tx). The third designated range may be less in signal strength coverage than the fourth designated range.

According to an embodiment, the phase shifter 7372 may include an amplifier for amplifying the first network (e.g., legacy network) transmit signal (LTE Tx) received from the first RFFE 720 and a phase shift device for generating an anti-phase signal of the amplified first network (e.g., legacy network) transmit signal (LTE Tx).

According to an embodiment, the second coupler 737 may send a second network (e.g., 5G network) primary receive signal (NR PRx) and a first network (e.g., legacy network) diversity receive signal (LTE DRx) to the second switch module 736. In this case, if the received second network (e.g., 5G network) primary receive signal (NR PRx) falls in the fourth designated range, the second coupler module 737 may remove the first network (e.g., legacy network) transmit signal (LTE Tx) included in the second network (e.g., 5G network) primary receive signal (NR PRx) and send the second network (e.g., 5G network) primary receive signal (NR PRx) to the second antenna switch module 736. The third designated range may be less in signal strength coverage than the fourth designated range.

According to an embodiment, the second antenna switch module 736 may send the second network (e.g., 5G network) primary receive signal (NR PRx) and the first network (e.g., legacy network) diversity receive signal (LTE DRx) to the second duplex 735.

According to an embodiment, the second duplex 735 may send the second network (e.g., 5G network) primary receive signal (NR PRx) and the first network (e.g., legacy network) diversity receive signal (LTE DRx) to the second receive signal amplifier 734.

According to an embodiment, the second receive signal amplifier 734 may send the amplified second network (e.g., 5G network) primary receive signal (NR PRx) and first network (e.g., legacy network) diversity receive signal (LTE DRx) to the second receive signal splitter 732.

According to an embodiment, the second receive signal splitter 732 may send the amplified second network (e.g., 5G network) primary receive signal (NR PRx) and first network (e.g., legacy network) diversity receive signal (LTE DRx) to the transceiver 710.

Figure 5:
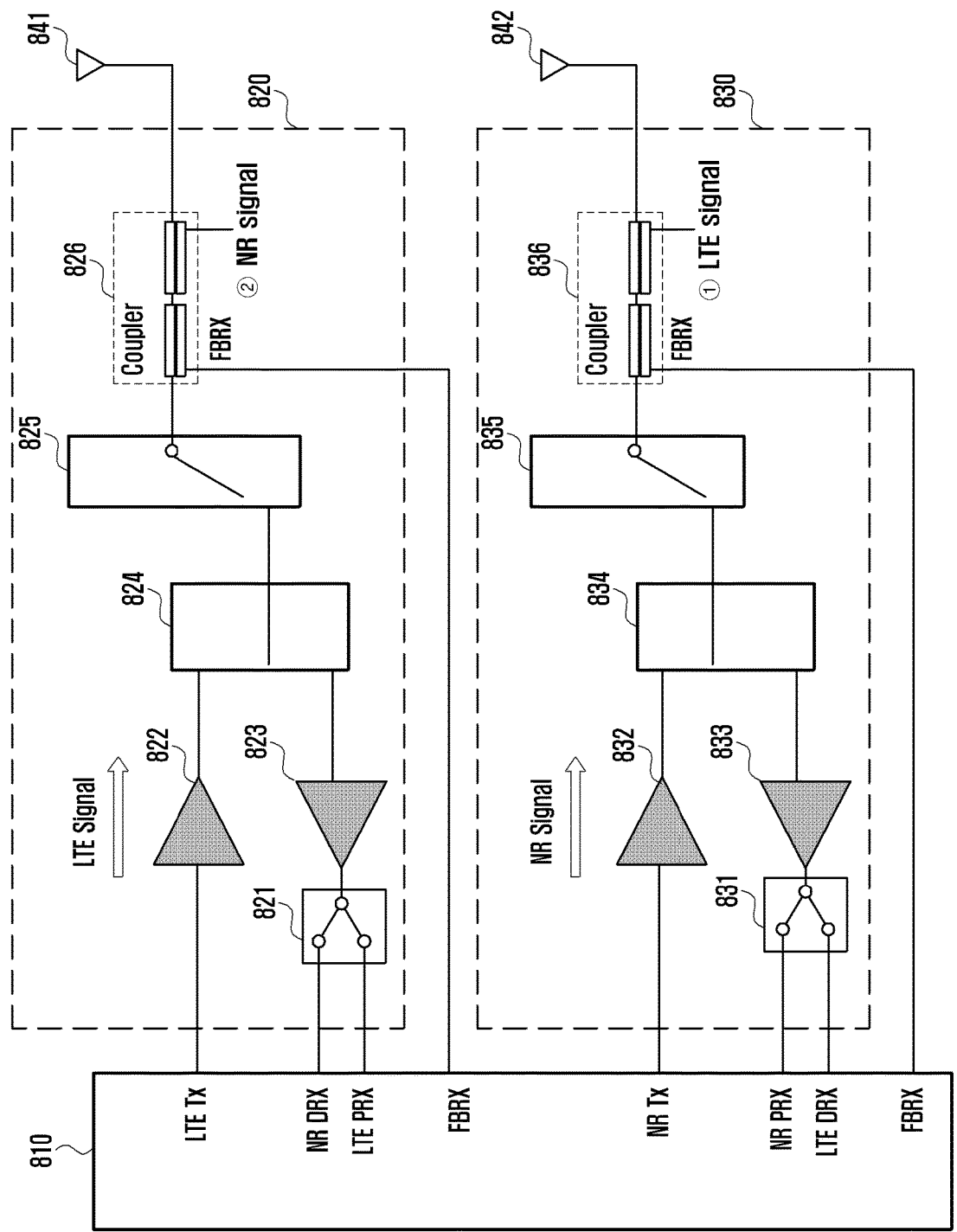
FIG. 5 is a circuit diagram illustrating a configuration of an electronic device equipped with a transceiver including a phase shifter for supporting legacy network communication and 5G network communication according to an embodiment.

FIG. 5 is a circuit diagram illustrating a configuration of an electronic device 401 equipped with a transceiver including a phase shifter for supporting legacy network communication and 5G network communication according to an embodiment of the disclosure.

According to an embodiment, the electronic device 401 may include a transceiver 810 (e.g., the transceiver 610 in FIG. 3), a first RFFE 820, a second RFFE 830, a first antenna module 841, and a second antenna module 842.

According to an embodiment, the transceiver 810 may transmit and receive the first network (e.g., legacy network) transmit signal (LTE Tx), the first network (e.g., legacy network) primary receive signal (LTE primary receive signal (PRx)), the first network (e.g., legacy network) diversity receive signal (LTE diversity receive signal (DRx)), the second network (e.g., 5G network) transmit signal (NR Tx), the second network (e.g., 5G network) primary receive signal (NR primary receive signal (PRx)), the second network (e.g., 5G network) diversity receive signal (NR diversity receive signal (DRx)), and the feedback receive signal (FBRx).

According to an embodiment, the transceiver 810 may include signal terminals for transmitting and receiving the first network (e.g., legacy network) transmit signal (LTE Tx), the first network (e.g., legacy network) primary receive signal (LTE primary receive signal (PRx)), the first network (e.g., legacy network) diversity receive signal (LTE diversity receive signal (DRx)), the second network (e.g., 5G network) transmit signal (NR Tx), the second network (e.g., 5G network) primary receive signal (NR primary receive signal (PRx)), the second network (e.g., 5G network) diversity receive signal (NR diversity receive signal (DRx)), and the feedback receive signal (FBRx).

According to an embodiment, the first RFFE 820 may receive a first network (e.g., legacy network) transmit signal (LTE Tx) from the transceiver 810 and send it to the first antenna module 841. The first RFFE 820 may receive a second network (e.g., 5G network) diversity receive signal (NR DRx) and a first network (e.g., legacy network) primary receive signal (LTE PRx) through the first antenna module 841 and send it to the transceiver 810.

According to an embodiment, the second RFFE 830 may receive the second network (e.g., 5G network) transmit signal (NR Tx) from the transceiver 810 and send it to the second antenna module 842. The second RFFE 830 may receive a first network (e.g., legacy network) diversity receive signal (LTE DRx) and a second network (e.g., 5G network) primary receive signal (NR PRx) through the second antenna module 842 and send it to the transceiver 810.

According to an embodiment, the transceiver 810 may send at least part of an anti-phase signal of the first network (e.g., legacy network) transmit signal (LTE Tx) to the second RFFE 830.

According to an embodiment, the transceiver 810 may send at least part of an anti-phase signal of the second network (e.g., 5G network) transmit signal (NR Tx) to the first RFFE 820.

According to an embodiment, the first RFFE 820 may receive at least part of the anti-phase signal of the second network (e.g., 5G network) transmit signal (NR Tx) from the transceiver 810.

According to an embodiment, the second RFFE 830 may receive at least part of the anti-phase signal of the first network (e.g., legacy network) transmit signal (LTE Tx) from the transceiver 810.

According to an embodiment, in the case where the electronic device 401 is simultaneously using the first network (e.g., legacy network) and the second network (e.g., 5G network), the first RFFE 820 may receive a first network (e.g., legacy network) primary receive signal (LTE PRx) through the first antenna module 841. In this case, a second network (e.g., 5G network) transmit signal (NR Tx) may be included in the received first network (e.g., legacy network) primary receive signal (LTE PRx).

According to an embodiment, in the case where the electronic device 401 is simultaneously using the first network (e.g., legacy network) and the second network (e.g., 5G network), if the amplitude of the first network (e.g., legacy network) primary receive signal (LTE PRx) falls in a first designated range, the transceiver 810 may control the first RFFE 820 to disable the operation of attenuating the second network (e.g., 5G network) transmit signal (NR Tx) included in the received first network (e.g., legacy network) primary receive signal (LTE PRx).

According to an embodiment, in the case where the electronic device 401 is simultaneously using the first network (e.g., legacy network) and the second network (e.g., 5G network), if the amplitude of the received first network (e.g., legacy network) primary receive signal (LTE PRx) falls in a second designated range, the transceiver 810 may control the first RFFE 820 to enable the operation of attenuating the second network (e.g., 5G network) transmit signal (NR Tx) included in the received first network (e.g., legacy network) primary receive signal (LTE PRx). The first designated range may be less in signal strength coverage than the second designated range.

According to an embodiment, in the case where the electronic device 401 is simultaneously using the first network (e.g., legacy network) and the second network (e.g., 5G network), if the amplitude of the received first network (e.g., legacy network) primary receive signal (LTE PRx) falls in the second designated range, the first RFFE 820 may attenuate the second network (e.g., 5G network) transmit signal (NR Tx) included in the received first network (e.g., legacy network) primary receive signal (LTE PRx) based on the anti-phase signal of the received second network (e.g., 5G network) transmit signal (NR Tx) that is received from the transceiver 810. The first designated range may be less in signal strength coverage than the second designated range.

According to an embodiment, the first RFFE 820 may receive an anti-phase signal of the received second network (e.g., 5G network) transmit signal (NR Tx) from the transceiver 810. The first RFFE 820 may attenuate the second network (e.g., 5G network) transmit signal (NR Tx) included in the received first network (e.g., legacy network) primary receive signal (LTE PRx) based on the anti-phase signal of the received second network (e.g., 5G network) transmit signal (NR Tx).

According to an embodiment, in the case where the electronic device 401 is simultaneously using the first network (e.g., legacy network) and the second network (e.g., 5G network), the second RFFE 830 may receive a second network (e.g., 5G network) primary receive signal (NR PRx) through the second antenna module 842. In this case, a first network (e.g., legacy network) transmit signal (LTE Tx) may be included in the received second network (e.g., 5G network) primary receive signal (NR PRx).

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in a third designated range, the transceiver 810 may control the second RFFE 830 to disable the operation of attenuating the first network (e.g., legacy network) transmit signal (LTE Tx) included in the received second network (e.g., 5G network) primary receive signal (NR PRx).

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in a fourth designated range, the transceiver 810 may control the second RFFE 830 to enable the operation of attenuating the first network (e.g., legacy network) transmit signal (LTE Tx) included in the received second network (e.g., 5G network) primary receive signal (NR PRx). The third designated range may be less in signal strength coverage than the fourth designated range.

According to an embodiment, in the case where the electronic device 401 is simultaneously using the first network (e.g., legacy network) and the second network (e.g., 5G network), if the amplitude of the received second network (e.g., 5G network) primary receive signal (NR PRx) is equal to or greater than the fourth designated range, the second RFFE 830 may identify the amplitude of the received second network (e.g., 5G network) primary receive signal (NR PRx).

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in the fourth designated range, the second RFFE 830 may attenuate the first network (e.g., legacy network) transmit signal (LTE Tx) included in the received second network (e.g., 5G network) primary receive signal (NR PRx) based on the anti-phase signal of the first network (e.g., legacy network) transmit signal (LTE Tx) received from the transceiver 810.

According to an embodiment, the second RFFE 830 may receive an anti-phase signal of the received first network (e.g., legacy network) transmit signal (LTE Tx) from the transceiver 810. The second RFFE 830 may attenuate the first network (e.g., legacy network) transmit signal (LTE Tx) included in the received second network (e.g., 5G network) primary receive signal (NR PRx) based on the anti-phase signal of the received first network (e.g., legacy network) transmit signal (LTE Tx).

According to an embodiment, the first RFFE 820 may include a first receive signal (Rx) splitter (821), a first transmit signal (Tx) amplifier 822, a first receive signal (Rx) amplifier 823, a first duplexer 824, a first antenna switch module 825, and a first coupler module 826.

According to an embodiment, the transceiver 810 may send the first network (e.g., legacy network) transmit signal (LTE Tx) to the first transmit signal amplifier 822.

According to an embodiment, the transceiver 810 may send an anti-phase signal of the first network (e.g., legacy network) transmit signal (LTE Tx) to the second RFFE 830.

According to an embodiment, the first transmit signal amplifier 822 may amplify the first network (e.g., legacy network) transmit signal (LTE Tx) and send the amplified first network (e.g., legacy network) transmit signal (LTE Tx) to the first duplexer 824.

According to an embodiment, the first duplexer 824 may send the amplified first network (e.g., legacy network) transmit signal (LTE Tx) to the first antenna switch module 825.

According to an embodiment, the first antenna switch module 825 may send the amplified first network (e.g., legacy network) transmit signal (LTE Tx) to the first coupler 826.

According to an embodiment, the first coupler module 826 may send the amplified first network (e.g., legacy network) transmit signal (LTE Tx) to the first antenna module 841.

According to an embodiment, the first coupler module 826 may use the amplified first network (e.g., legacy network) transmit signal (LTE Tx) as a feedback receive signal (FBRx).

According to an embodiment, the first coupler module 826 may include at least one coupler.

According to an embodiment, the at least one coupler of the first coupler module 826 may be connected between the first antenna switch module 825 and the first antenna module 841.

According to an embodiment, the first antenna module 841 may radiate the amplified first network (e.g., legacy network) transmit signal (LTE Tx).

According to an embodiment, the first antenna module 841 may receive a first network (e.g., legacy network) primary receive signal (LTE PRx) and a second network (e.g., 5G network) diversity receive signal (NR DRx) and send them to the first coupler module 826.

According to an embodiment, if the first network (e.g., legacy network) primary receive signal (LTE PRx) received from the first antenna module 841 falls in a first designated range, the transceiver 810 may control the first coupler 826 to disable the operation of attenuating the second network (e.g., 5G network) transmit signal (NR Tx) included in the first network (e.g., legacy network) primary receive signal (LTE PRx).

According to an embodiment, if the first network (e.g., legacy network) primary receive signal (LTE PRx) received from the first antenna module 841 falls in a second designated range, the transceiver 810 may control the first coupler module 826 to enable the operation of attenuating the second network (e.g., 5G network) transmit signal (NR Tx) included in the first network (e.g., legacy network) primary receive signal (LTE PRx). The first designated range may be less in signal strength coverage than the second designated range.

According to an embodiment, the first coupler module 826 may identify, if the first network (e.g., legacy network) primary receive signal (LTE PRx) received from the first antenna module 841 is equal to or greater than the second designated range, the amplitude of the received first network (e.g., legacy network) primary receive signal (LTE PRx).

According to an embodiment, if the first network (e.g., legacy network) primary receive signal (LTE PRx) received from the first antenna module 841 falls in the second designated range, the first coupler module 826 may attenuate the second network (e.g., 5G network) transmit signal (NR Tx) included in the first network (e.g., legacy network) primary receive signal (LTE PRx) based on the anti-phase signal of the second network (e.g., 5G network) transmit signal (NR Tx) received from the transceiver 810. The first designated range may be less in signal strength coverage than the second designated range.

According to an embodiment, the first coupler module 826 may send the first network (e.g., legacy network) primary receive signal (LTE PRx) and the second network (e.g., 5G network) diversity receive signal (NR DRx) to the first antenna switch module 825. In this case, if the first network (e.g., legacy network) primary receive signal (LTE PRx) falls in the second designated range, the first coupler module 826 may remove the second network (e.g., 5G network) transmit signal (NR Tx) included in the first network (e.g., legacy network) primary receive signal (LTE PRx) and send the first network (e.g., legacy network) primary receive signal (LTE PRx) to the first antenna switch module 825.

According to an embodiment, the first antenna switch module 825 may send the first network (e.g., legacy network) primary receive signal (LTE PRx) and the second network (e.g., 5G network) diversity receive signal (NR DRx) to the first duplexer 824.

According to an embodiment, the first duplexer 824 may send the first network (e.g., legacy network) primary receive signal (LTE PRx) and the second network (e.g., 5G network) diversity receive signal (NR DRx) to the first receive signal amplifier 823.

According to an embodiment, the first receive signal amplifier 823 may send the amplified first network (e.g., legacy network) primary receive signal (LTE PRx) and second network (e.g., 5G network) diversity receive signal (NR DRx) to the first receive signal splitter 821.

According to an embodiment, the first receive signal splitter 821 may send the amplified first network (e.g., legacy network) primary receive signal (LTE PRx) and second network (e.g., 5G network) diversity receive signal (NR DRx) to the transceiver 810.

According to an embodiment, the second RFFE 83 may include a second receive signal (Rx) splitter 831, a second transmit signal (Tx) amplifier 832, a second receive signal (Rx) amplifier 833, a second duplexer 834, a second antenna switch module 835, and a second coupler module 836.

According to an embodiment, the transceiver 810 may send the second network (e.g., 5G network) transmit signal (NR Tx) to the second transmit signal amplifier 832.

According to an embodiment, the transceiver 810 may send an anti-phase signal of the second network (e.g., 5G network) transmit signal (NR Tx) to the first RFFE 820.

According to an embodiment, the second transmit signal amplifier 832 may amplify the second network (e.g., 5G network) transmit signal (NR Tx) and send the amplified second network (e.g., 5G network) transmit signal (NR Tx) to the second duplexer 834.

According to an embodiment, the second duplexer 834 may send the amplified second network (e.g., 5G network) transmit signal (NR Tx) to the second antenna switch module 835.

According to an embodiment, the second antenna switch module 835 may send the amplified second network (e.g., 5G network) transmit signal (NR Tx) to the second coupler module 836.

According to an embodiment, the second coupler module 836 may send the amplified second network (e.g., 5G network) transmit signal (NR Tx) to the second antenna module 842.

According to an embodiment, the second coupler module 836 may use the amplified second network (e.g., 5G network) transmit signal (NR Tx) as a feedback receive signal (FBRx).

According to an embodiment, the coupler module 836 may include at least one coupler.

According to an embodiment, the at least one coupler of the second coupler module 836 may be connected between the second antenna switch module 835 and the second antenna module 842.

According to an embodiment, the second antenna module 842 may radiate the amplified second network (e.g., 5G network) transmit signal (NR Tx).

According to an embodiment, the second antenna module 842 may receive a second network (e.g., 5G network) primary receive signal (NR PRx) and a first network (e.g., legacy network) diversity receive signal (LTE DRx) and send them to the second coupler module 836.

According to an embodiment, if the second network (e.g., 5G network) primary receive signal (NR PRx) received from the second antenna module 842 falls in a fourth designated range, the second coupler module 836 may attenuate the first network (e.g., legacy network) transmit signal (LTE Tx) included in the second network (e.g., 5G network) primary receive signal (NR PRx) based on an anti-phase signal of the first network (e.g., legacy network) transmit signal (LTE Tx) received from the transceiver 810.

According to an embodiment, the second coupler 836 may send the second network (e.g., 5G network) primary receive signal (NR PRx) and the first network (e.g., legacy network) diversity receive signal (LTE DRx) to the second antenna switch module 835. In this case, if the received second network (e.g., 5G network) primary receive signal (NR PRx) falls in the fourth designated range, the second coupler module 836 may remove the first network (e.g., legacy network) transmit signal (LTE Tx) included in the second network (e.g., 5G network) primary receive signal (NR PRx) and send the second network (e.g., 5G network) primary receive signal (NR PRx) to the second antenna switch module 835. The third designated range may be less in signal strength coverage than the fourth designated range.

According to an embodiment, the second antenna switch module 825 may send the second network (e.g., 5G network) primary receive signal (NR PRx) and the first network (e.g., legacy network) diversity receive signal (LTE DRx) to the second duplexer 834.

According to an embodiment, the second duplexer 834 may send the second network (e.g., 5G network) primary receive signal (NR PRx) and the first network (e.g., legacy network) diversity receive signal (LTE DRx) to the second receive signal amplifier 833.

According to an embodiment, the second receive signal amplifier 833 may send the amplified second network (e.g., 5G network) primary receive signal (NR PRx) and first network (e.g., legacy network) diversity receive signal (LTE DRx) to the second receive signal splitter 831.

According to an embodiment, the second receive signal splitter 831 may send the amplified second network (e.g., 5G network) primary receive signal (NR PRx) and first network (e.g., legacy network) diversity receive signal (LTE DRx) to the transceiver 810.

Figure 6:
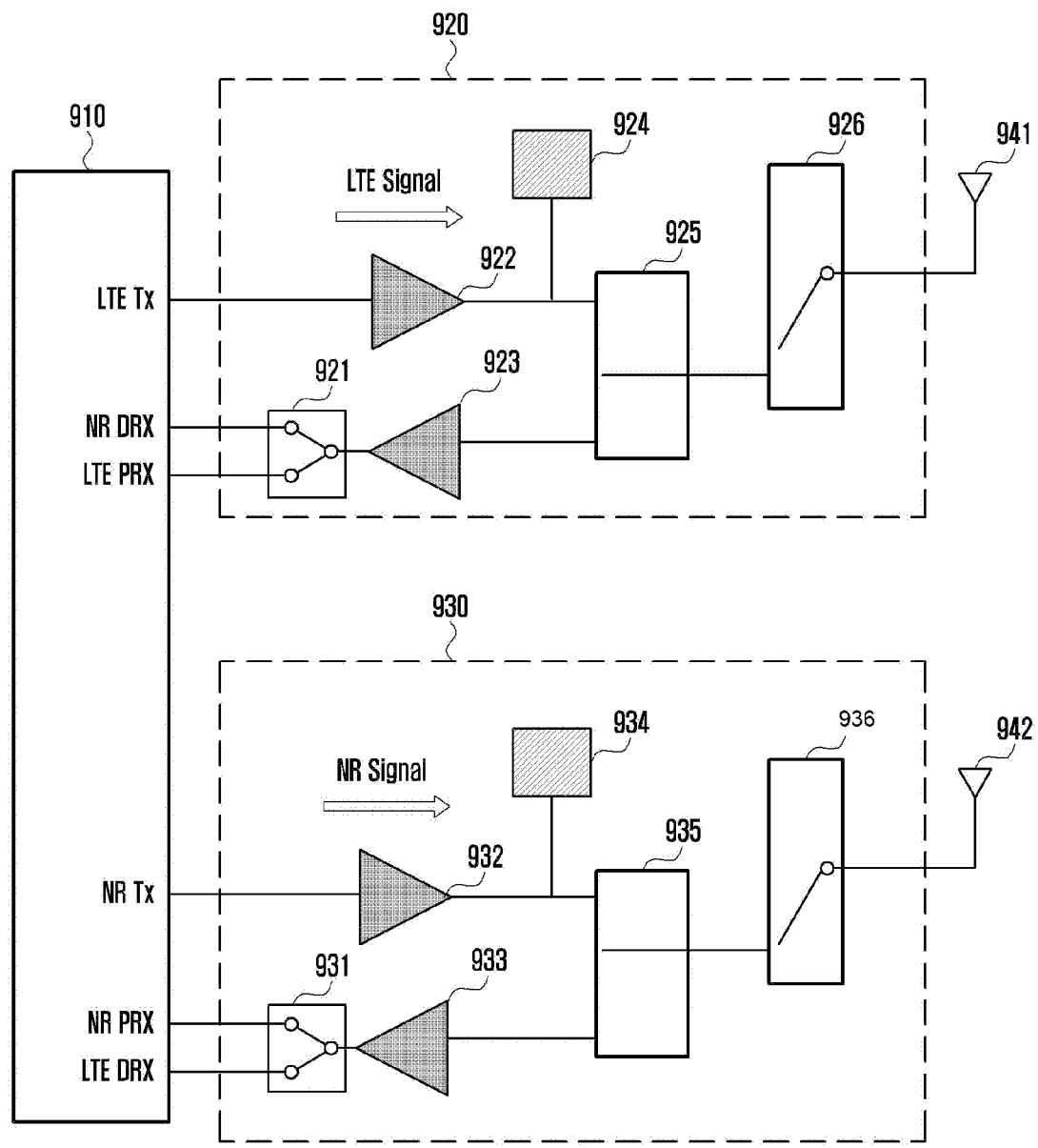
FIG. 6 is a circuit diagram illustrating a configuration of an electronic device equipped with a tunable filter in a front-end module for supporting legacy network communication and 5G network communication according to an embodiment.

FIG. 6 is a circuit diagram illustrating a configuration of an electronic device 401 equipped with a tunable filter in a front-end module for supporting legacy network communication and 5G network communication according to an embodiment of the disclosure.

According to an embodiment, the electronic device 401 may include a transceiver 910 (e.g., the transceiver 610 in FIG. 3), a first RFFE 920, a second RFFE 930, a first antenna module 941, and a second antenna module 942.

According to an embodiment, the transceiver 910 may transmit and receive the first network (e.g., legacy network) transmit signal (LTE Tx), the first network (e.g., legacy network) primary receive signal (LTE primary receive signal (PRx)), the first network (e.g., legacy network) diversity receive signal (LTE diversity receive signal (DRx)), the second network (e.g., 5G network) transmit signal (NR Tx), the second network (e.g., 5G network) primary receive signal (NR primary receive signal (PRx)), the second network (e.g., 5G network) diversity receive signal (NR diversity receive signal (DRx)), and the feedback receive signal (FBRx).

According to an embodiment, the transceiver 910 may include signal terminals for transmitting and receiving the first network (e.g., legacy network) transmit signal (LTE Tx), the first network (e.g., legacy network) primary receive signal (LTE primary receive signal (PRx)), the first network (e.g., legacy network) diversity receive signal (LTE diversity receive signal (DRx)), the second network (e.g., 5G network) transmit signal (NR Tx), the second network (e.g., 5G network) primary receive signal (NR primary receive signal (PRx)), the second network (e.g., 5G network) diversity receive signal (NR diversity receive signal (DRx)), and the feedback receive signal (FBRx).

According to an embodiment, the first RFFE 920 may receive a first network (e.g., legacy network) transmit signal (LTE Tx) from the transceiver 910 and send it to the first antenna module 841. The first RFFE 920 may receive a second network (e.g., 5G network) diversity receive signal (NR DRx) or a first network (e.g., legacy network) primary receive signal (LTE PRx) through the first antenna module 941 and send it to the transceiver 910.

According to an embodiment, the second RFFE 930 may receive a second network (e.g., 5G network) transmit signal (NR Tx) from the transceiver 910 and send it to the second antenna module 942. The second RFFE 930 may receive a first network (e.g., legacy network) diversity receive signal (LTE DRx) or a second network (e.g., 5G network) primary receive signal (NR PRx) through the second antenna module 942 and send it to the transceiver 910.

According to an embodiment, in the case where the electronic device 401 is simultaneously using the first network (e.g., legacy network) and the second network (e.g., 5G network), the first RFFE 920 may receive a first network (e.g., legacy network) primary receive signal (LTE PRx) through the first antenna module 941. In this case, a second network (e.g., 5G network) transmit signal (NR Tx) may be included in the received first network (e.g., legacy network) primary receive signal (LTE PRx).

According to an embodiment, in the case where the electronic device 401 is simultaneously using the first network (e.g., legacy network) and the second network (e.g., 5G network), if the amplitude of the first network (e.g., legacy network) primary receive signal (LTE PRx) falls in a first designated range, the transceiver 910 may control the first RFFE 920 to disable the operation of attenuating the second network (e.g., 5G network) transmit signal (NR Tx) with the first tunable filter 924.

According to an embodiment, in the case where the electronic device 401 is simultaneously using the first network (e.g., legacy network) and the second network (e.g., 5G network), if the amplitude of the received first network (e.g., legacy network) primary receive signal (LTE PRx) falls in a second designated range, the transceiver 910 may control the first RFFE 920 to enable the operation an attenuating the second network (e.g., 5G network) transmit signal (NR Tx) with the first tunable filter 924. The first designated range may be less in signal strength coverage than the second designated range.

According to an embodiment, in the case where the electronic device 401 is simultaneously using the first network (e.g., legacy network) and the second network (e.g., 5G network), if the amplitude of the received first network (e.g., legacy network) primary receive signal (LTE PRx) is equal to or greater than the second designated range, the first RFFE 920 may identify the amplitude of the received first network (e.g., legacy network) primary receive signal (LTE PRx).

According to an embodiment, in the case where the electronic device 401 is simultaneously using the first network (e.g., legacy network) and the second network (e.g., 5G network), if the amplitude of the received first network (e.g., legacy network) primary receive signal (LTE PRx) falls in the second designated range, the first RFFE 920 may attenuate the second network (e.g., 5G network) transmit signal (NR Tx) with the first tunable filter 924.

According to an embodiment, the first RFFE 920 may attenuate the second network (e.g., 5G network) transmit signal (NR Tx) included in the first network (e.g., legacy network) primary receive signal (LTE PRx) with the first tunable filter 924.

According to an embodiment, in the case where the electronic device 401 is simultaneously using the first network (e.g., legacy network) and the second network (e.g., 5G network), the second RFFE 930 may receive a second network (e.g., 5G network) primary receive signal (NR PRx) through the second antenna module 942. In this case, a first network (e.g., legacy network) transmit signal (LTE Tx) may be included in the received second network (e.g., 5G network) primary receive signal (NR PRx).

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in a third designated range, the transceiver 910 may control the second RFFE 930 to disable the operation of attenuating the first network (e.g., legacy network) transmit signal (LTE Tx) included in the received second network (e.g., 5G network) primary receive signal (NR PRx) with the second tunable filter 934.

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in a fourth designated range, the transceiver 910 may control the second RFFE 930 to enable the operation of attenuating the first network (e.g., legacy network) transmit signal (LTE Tx) included in the received second network (e.g., 5G network) primary receive signal (NR PRx) with the second tunable filter 934. The third designated range may be less in signal strength coverage than the fourth designated range.

According to an embodiment, in the case where the electronic device 401 is simultaneously using the first network (e.g., legacy network) and the second network (e.g., 5G network), if the amplitude of the received second network (e.g., 5G network) primary receive signal (NR PRx) is equal to or greater than the fourth designated range, the second RFFE 930 may identify the amplitude of the received second network (e.g., 5G network) primary receive signal (NR PRx).

According to an embodiment, in the case where the electronic device 401 is simultaneously using the first network (e.g., legacy network) and the second network (e.g., 5G network), if the amplitude of the received second network (e.g., 5G network) primary receive signal (NR PRx) falls in the fourth designated range, the second RFFE 930 may attenuate the first network (e.g., legacy network) transmit signal (LTE Tx) included in the received second network (e.g., 5G network) primary receive signal (NR PRx) with the second tunable filter 934. The third designated range may be less in signal strength coverage than the fourth designated range.

According to an embodiment, the second RFFE 930 may attenuate the first network (e.g., legacy network) transmit signal (LTE Tx) included in the received second network (e.g., 5G network) primary receive signal (NR PRx) with the second tunable filter 934.

According to an embodiment, the first RFFE 920 may include a first receive signal (Rx) splitter 921, a first transmit signal (Tx) amplifier 922, a first receive signal amplifier 923, a first tunable filter 924, a first duplexer 925, and a first antenna switch module 926.

According to an embodiment, the transceiver 910 may send a first network (e.g., legacy network) transmit signal (LTE Tx) to the first transmit signal amplifier 922.

According to an embodiment, the first transmit signal amplifier 922 may amplify the first network (e.g., legacy network) transmit signal (LTE Tx) and send it to the first duplexer 925.

According to an embodiment, the first tunable filter 924 may be connected between the first transmit signal amplifier 922 and the first duplexer 925.

According to an embodiment, the first tunable filter 924 may attenuate a frequency of a second network (e.g., 5G network) transmit signal (NR Tx) band. The first tunable filter 924 may be a notch filter for removing the frequency of the second network (e.g., 5G network) transmit signal (NR Tx).

According to an embodiment, the first tunable filter 924 may remove the frequency of the second network (e.g., 5G network) transmit signal (NR Tx) to attenuate the frequency of the second network (e.g., 5G network) transmit signal (NR Tx) band in the first network (e.g., legacy network) transmit signal (LTE Tx).

According to an embodiment, the first tunable filter 924 may attenuate the frequency of the second network (e.g., 5G network) transmit signal (NR Tx) band included in the received first network (e.g., legacy network) primary receive signal (LTE PRx) using a second network (e.g., 5G network) transmit signal (NR Tx) band removal characteristic.

According to an embodiment, the first duplexer 925 may send an amplified first network (e.g., legacy network) transmit signal (LTE Tx) to the first antenna switch module 926.

According to an embodiment, the first antenna switch module 926 may send the amplified first network (e.g., legacy network) transmit signal (LTE Tx) to the first antenna module 941.

According to an embodiment, the first antenna module 941 may radiate the amplified first network (e.g., legacy network) transmit signal (LTE Tx).

According to an embodiment, the first antenna module 941 may receive a first network (e.g., legacy network) primary receive signal (LTE PRx) and a second network (e.g., 5G network) diversity receive signal (NR DRx) and send them to the first antenna switch module 926.

According to an embodiment, the first antenna switch module 926 may send the first network (e.g., legacy network) primary receive signal (LTE PRx) and the second network (e.g., 5G network) diversity receive signal (NR DRx) to the first duplexer 925.

According to an embodiment, the first duplexer 925 may send the first network (e.g., legacy network) primary receive signal (LTE PRx) and the second network (e.g., 5G network) diversity receive signal (NR DRx) to the first receive signal amplifier 923.

According to an embodiment, if the amplitude of the first network (e.g., legacy network) primary receive signal (LTE PRx) received from the first antenna module 941 falls in a first designated range, the electronic device 401 may disable the operation of attenuating the second network (e.g., 5G network) transmit signal (NR Tx) included in the first network (e.g., legacy network) primary receive signal (LTE PRx) with the first tunable filter 924 connected to the first duplexer 925, when sending the first network (e.g., legacy network) primary receive signal (LTE PRx) and the second network (e.g., 5G network) diversity receive signal (NR DRx) to the first receive signal amplifier 923.

According to an embodiment, if the amplitude of the first network (e.g., legacy network) primary receive signal (LTE PRx) received from the first antenna module 941 falls in a second designated range, the electronic device 401 may enable the operation of attenuating the second network (e.g., 5G network) transmit signal (NR Tx) included in the first network (e.g., legacy network) primary receive signal (LTE PRx) with the first tunable filter 924 connected to the first duplexer 925, when sending the first network (e.g., legacy network) primary receive signal (LTE PRx) and the second network (e.g., 5G network) diversity receive signal (NR DRx) to the first receive signal amplifier 923.

According to an embodiment, if the amplitude of the first network (e.g., legacy network) primary receive signal (LTE PRx) received from the first antenna module 941 is equal to or greater than the second designated range, the electronic device 401 may identify the amplitude of the received first network (e.g., legacy network) primary receive signal (LTE PRx), when sending the first network (e.g., legacy network) primary receive signal (LTE PRx) and the second network (e.g., 5G network) diversity receive signal (NR DRx) to the first receive signal amplifier 923.

According to an embodiment, if the amplitude of the first network (e.g., legacy network) primary receive signal (LTE PRx) received from the first antenna module 941 falls in the second designated range, the electronic device 401 may attenuate the second network (e.g., 5G network) transmit signal (NR Tx) included in the first network (e.g., legacy network) primary receive signal (LTE PRx) with the first tunable filter 924 connected to the first duplexer 925, when sending the first network (e.g., legacy network) primary receive signal (LTE PRx) and the second network (e.g., 5G network) diversity receive signal (NR DRx) to the first receive signal amplifier 923.

According to an embodiment, the first receive signal amplifier 923 may send the amplified first network (e.g., legacy network) primary receive signal (LTE PRx) and second network (e.g., 5G network) diversity receive signal (NR DRx) to the first receive signal splitter 921.

According to an embodiment, the first receive signal splitter 921 may send the amplified first network (e.g., legacy network) primary receive signal (LTE PRx) and second network (e.g., 5G network) diversity receive signal (NR DRx) to the transceiver 910.

According to an embodiment, the second RFFE 930 may include a second receive signal (Rx) splitter 931, a second transmit signal (Tx) amplifier 932, a second receive signal amplifier 933, a second tunable filter 934, a second duplexer 935, and a first antenna switch module 936.

According to an embodiment, the transceiver 910 may send a second network (e.g., 5G network) transmit signal (NR Tx) to the second transmit signal amplifier 932.

According to an embodiment, the second transmit signal amplifier may amplify the second network (e.g., 5G network) transmit signal (NR Tx) and send the amplified second network (e.g., 5G network) transmit signal (NR Tx) to the second duplexer 935.

According to an embodiment, the second tunable filter 934 may be connected between the first transmit signal amplifier 932 and the second duplexer 935.

According to an embodiment, the second tunable filter 934 may attenuate a frequency of a first network (e.g., legacy network) transmit signal (LTE Tx) band. The second tunable filter 934 may be a notch filter for removing the frequency of the first network (e.g., legacy network) transmit signal (LTE Tx) band.

According to an embodiment, the second tunable filter 934 may remove the frequency of the first network (e.g., legacy network) transmit signal (LTE Tx) band to attenuate the frequency of the first network (e.g., legacy network) transmit signal (LTE Tx) band in the second network (e.g., 5G network) transmit signal (NR Tx).

According to an embodiment, the second tunable filter 934 may attenuate the frequency of the first network (e.g., legacy network) transmit signal (LTE Tx) band included in the received second network (e.g., 5G network) primary receive signal (NR PRx) using a first network (e.g., legacy network) transmit signal (LTE Tx) band frequency removal characteristic.

According to an embodiment, the second duplexer 935 may send an amplified second network (e.g., 5G network) transmit signal (NR Tx) to the second antenna switch module 936.

According to an embodiment, the second antenna switch module 936 may send the amplified second network (e.g., 5G network) transmit signal (NR Tx) to the second antenna module 942.

According to an embodiment, the second antenna module 942 may radiate the amplified second network (e.g., 5G network) transmit signal (NR Tx).

According to an embodiment, the second antenna module 942 may receive a second network (e.g., 5G network) primary receive signal (NR PRx) and a first network (e.g., legacy network) diversity receive signal (LTE DRx) and send them to the second antenna switch module 936.

According to an embodiment, the second antenna switch module 936 may send the second network (e.g., 5G network) primary receive signal (NR PRx) and the first network (e.g., legacy network) diversity receive signal (LTE DRx) to the second duplexer 935.

According to an embodiment, the second duplexer 935 may send the second network (e.g., 5G network) primary receive signal (NR PRx) and the first network (e.g., legacy network) diversity receive signal (LTE DRx) to the second receive signal amplifier 933.

According to an embodiment, if the amplitude of the second network (e.g., 5G network) primary receive signal (NR PRx) received from the second antenna module 942 falls in a third designated range, the electronic device 401 may disable the operation of attenuating the first network (e.g., legacy network) transmit signal (LTE Tx) included in the second network (e.g., 5G network) primary receive signal (NR PRx) with the second tunable filter 934 connected to the second duplexer 935, when sending the second network (e.g., 5G network) primary receive signal (NR PRx) and the first network (e.g., legacy network) diversity receive signal (LTE DRx) to the second receive signal amplifier 933.

According to an embodiment, if the amplitude of the second network (e.g., 5G network) primary receive signal (NR PRx) received from the second antenna module 942 falls in a fourth designated range, the electronic device 401 may enable the operation of attenuating the first network (e.g., legacy network) transmit signal (LTE Tx) included in the second network (e.g., 5G network) primary receive signal (NR PRx) with the second tunable filter 934 connected to the second duplexer 935 when sending the second network (e.g., 5G network) primary receive signal (NR PRx) and the first network (e.g., legacy network) diversity receive signal (LTE DRx) to the second receive signal amplifier 933.

According to an embodiment, if the amplitude of the second network (e.g., 5G network) primary receive signal (NR PRx) received from the second antenna module 942 is equal to or greater than the fourth designated range, the electronic device 401 may identify the amplitude of the received second network (e.g., 5G network) primary receive signal (NR PRx), when sending the second network (e.g., 5G network) primary receive signal (NR PRx) and the first network (e.g., legacy network) diversity receive signal (LTE DRx) to the second receive signal amplifier 933.

According to an embodiment, if the amplitude of the second network (e.g., 5G network) primary receive signal (NR PRx) received from the second antenna module 942 falls in the fourth designated range, the electronic device 401 may attenuate the first network (e.g., legacy network) transmit signal (LTE Tx) included in the second network (e.g., 5G network) primary receive signal (NR PRx) with the second tunable filter 934 connected to the second duplexer 935, when sending the second network (e.g., 5G network) primary receive signal (NR PRx) and the first network (e.g., legacy network) diversity receive signal (LTE DRx) to the second receive signal amplifier 933.

According to an embodiment, the second receive signal amplifier 933 may send the amplified second network (e.g., 5G network) primary receive signal (NR PRx) and first network (e.g., legacy network) diversity receive signal (LTE DRx) to the second receive signal splitter 931.

According to an embodiment, the second receive signal splitter 931 may send the amplified second network (e.g., 5G network) primary receive signal (NR PRx) and first network (e.g., legacy network) diversity receive signal (LTE DRx) to the transceiver 910.

Figure 7A:
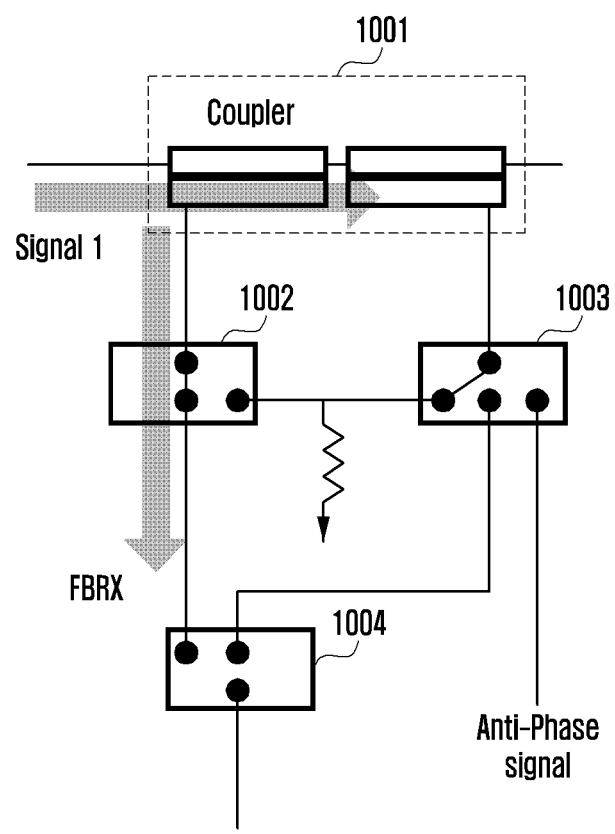
FIGS. 7A to 7C are circuit diagrams illustrating operations of the front-end module of FIG. 4 which includes a phase shifter.
Figure 7B:
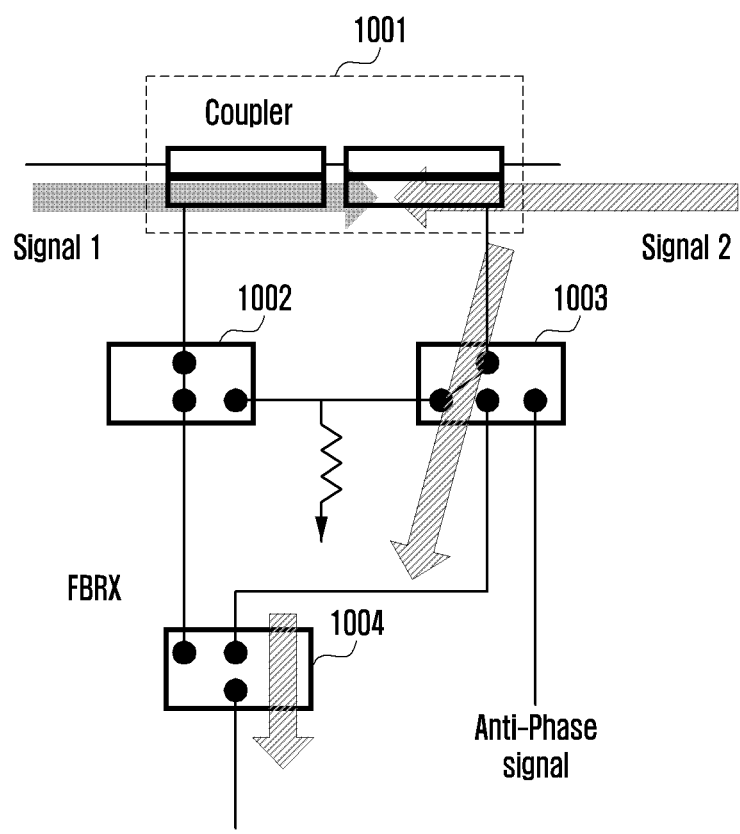
Figure 7C:
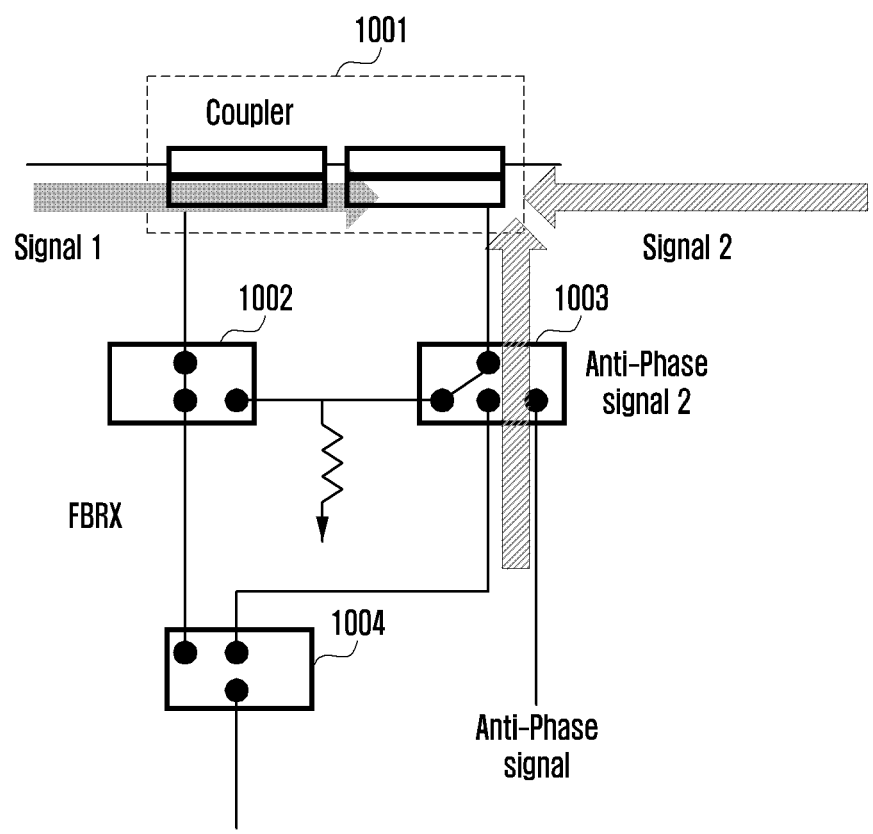

FIGS. 7A to 7C are circuit diagrams illustrating operations of the front-end module of FIG. 4 which includes a phase shifter.

In FIGS. 7A to 7C, a coupler module (e.g., the first coupler 727 or the second coupler 737 in FIG. 4) may include a coupler 1001 and first to third switches 1002, 1003, and 1004.

In FIG. 7A, the coupler 1001 may send a first signal (e.g., the first network (e.g., legacy network) transmit signal (LTE Tx) or the second network (e.g., 5G network) transmit signal (NR Tx) in FIG. 4)) to an antenna module (e.g., the first antenna module 741 or the second antenna module 742 in FIG. 4). A control circuit (e.g., the transceiver 710 in FIG. 4) of the electronic device 401 may control the first switch 1002 connected to one end of the coupler 1001 and the third switch 1004 connected to the first switch 1002 such that at least part of a first signal can be used as a feedback receive signal (FBRx). In the electronic device 401, the other end of the coupler 1001 may be connected to the antenna module and the second switch 1003 in parallel.

The control circuit (e.g., the transceiver 710 in FIG. 4) may control so as to block a second signal (e.g., the anti-phase signal of the first network (e.g., legacy network) transmit signal (LTE Tx) or second network (e.g., 5G network) transmit signal (NR Tx) in FIG. 4) from reaching the coupler 1001.

In FIG. 7B, in the case where the electronic device 401 is simultaneously using the first signal (transmit signal) and the second signal (receive signal), the electronic device 401 may determine whether the signal strength of the second signal falls in a second designated range or whether the signal strength of the second signal falls in a fourth designated range. The control circuit (e.g., the transceiver 710 in FIG. 4) of the electronic device 401 may control the second switch 1003 to connect to the third switch 1004 to detect the signal strength of the second signal.

In FIG. 7C, in the case where the electronic device 401 is simultaneously using the first signal (transmit signal) and the second signal (receive signal), if it is determined that the signal strength of the second signal falls in the second designated range or the fourth designated range, the control circuit (e.g., the transceiver 710 in FIG. 4) may control the second switch 1003 to pass through the anti-phase signal of the second signal such that the electronic device 401 attenuates the second signal.

Figure 8A:
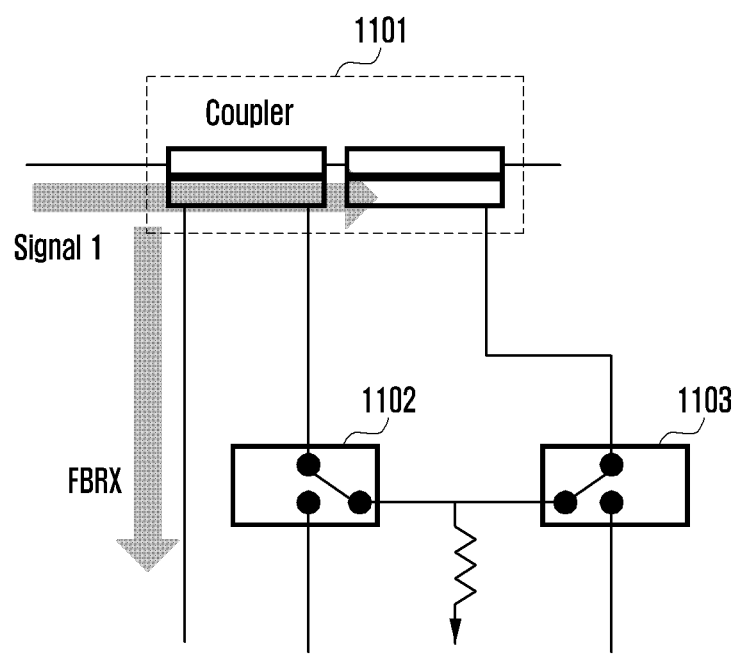
FIGS. 8A to 8C are circuit diagrams illustrating operations of the transceiver of FIG. 5 which includes a phase shifter.
Figure 8B:
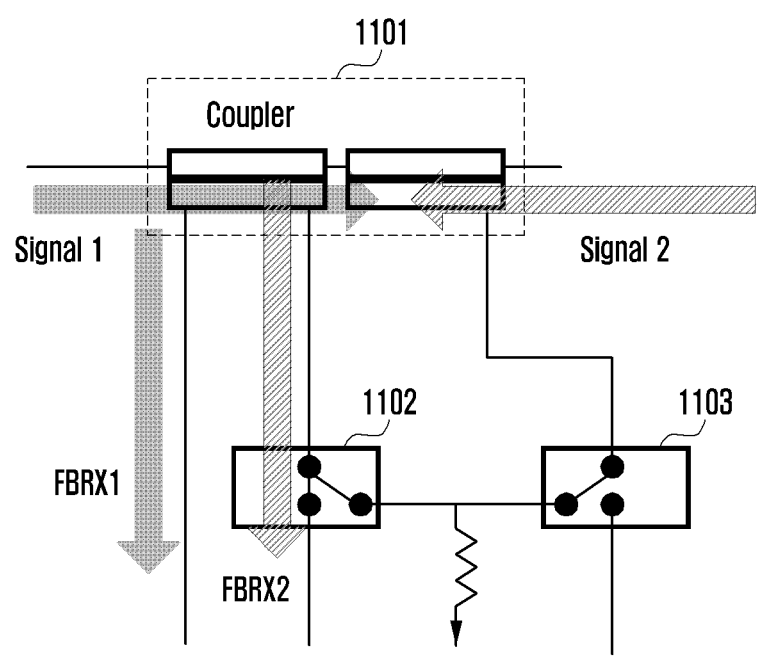
Figure 8C:
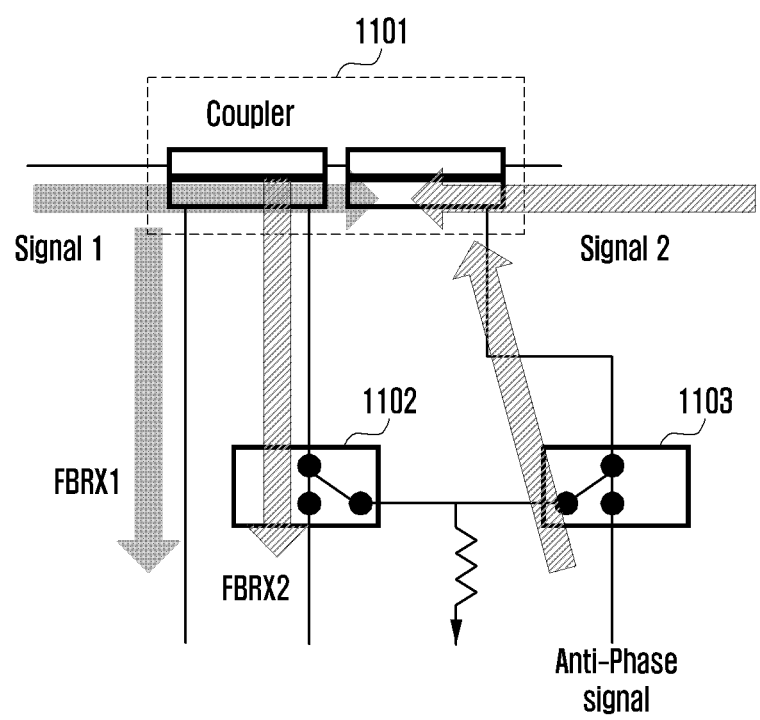

FIGS. 8A to 8C are circuit diagrams illustrating operations of the transceiver of FIG. 5 which includes a phase shifter.

In FIGS. 8A to 8C, a coupler module (e.g., the first coupler 826 or the second coupler module 836 in FIG. 5) may include a coupler 1101, a first switch 1102, and a second switch 1103.

In FIG. 8A, the coupler 1101 may send a first signal (e.g., first network (e.g., the legacy network) transmit signal (LTE Tx) or the second network (e.g., 5G network) transmit signal (NR Tx) in FIG. 5) to an antenna module (e.g., the first antenna module 841 or the second antenna module 842 in FIG. 5). The first signal may be diverted so that at least part of the first signal can be used as a feedback receive signal (FBRx).

In FIG. 8B, a control circuit (e.g., the transceiver 810 in FIG. 5) of the electronic device 401 may control the first switch 1102 to connect to one end of the coupler 1101 such that at least part of the second signal can be used as a feedback receive signal (FBRx).

The control circuit (e.g., the transceiver 910 in FIG. 5) of the electronic device 401 may control to block an anti-phase signal of the first signal (e.g., the legacy network transmit signal (LTE Tx) or the second network (e.g., 5G network) transmit signal (NR Tx) in FIG. 5) from reaching the coupler 1101.

In the case where the electronic device 401 is simultaneously using the first signal (transmit signal) and the second signal (receive signal), the electronic device 401 may determine whether the signal strength of the second signal falls in a second designated range or whether the signal strength of the second signal falls in a fourth designated range. The control circuit (e.g., the transceiver 810 in FIG. 5) of the electronic device 401 may control the first switch 1102 to establish a connection to detect the signal strength of the second signal. For example, the FBRx generated from the second signal (shown as FBRX2 in FIG. 8B) may be used to determine the signal strength of the second signal.

With reference to FIG. 8C, in the case of using the first signal (transmit signal) and the second signal (receive signal), if it is determined that the signal strength of the second signal falls in the second designated range or the fourth designated range, the control circuit (e.g., the transceiver 710 in FIG. 5) may control the second switch 1103 to pass through the anti-phase signal of the first signal such that the electronic device 401 attenuates the second signal.

Figure 9:
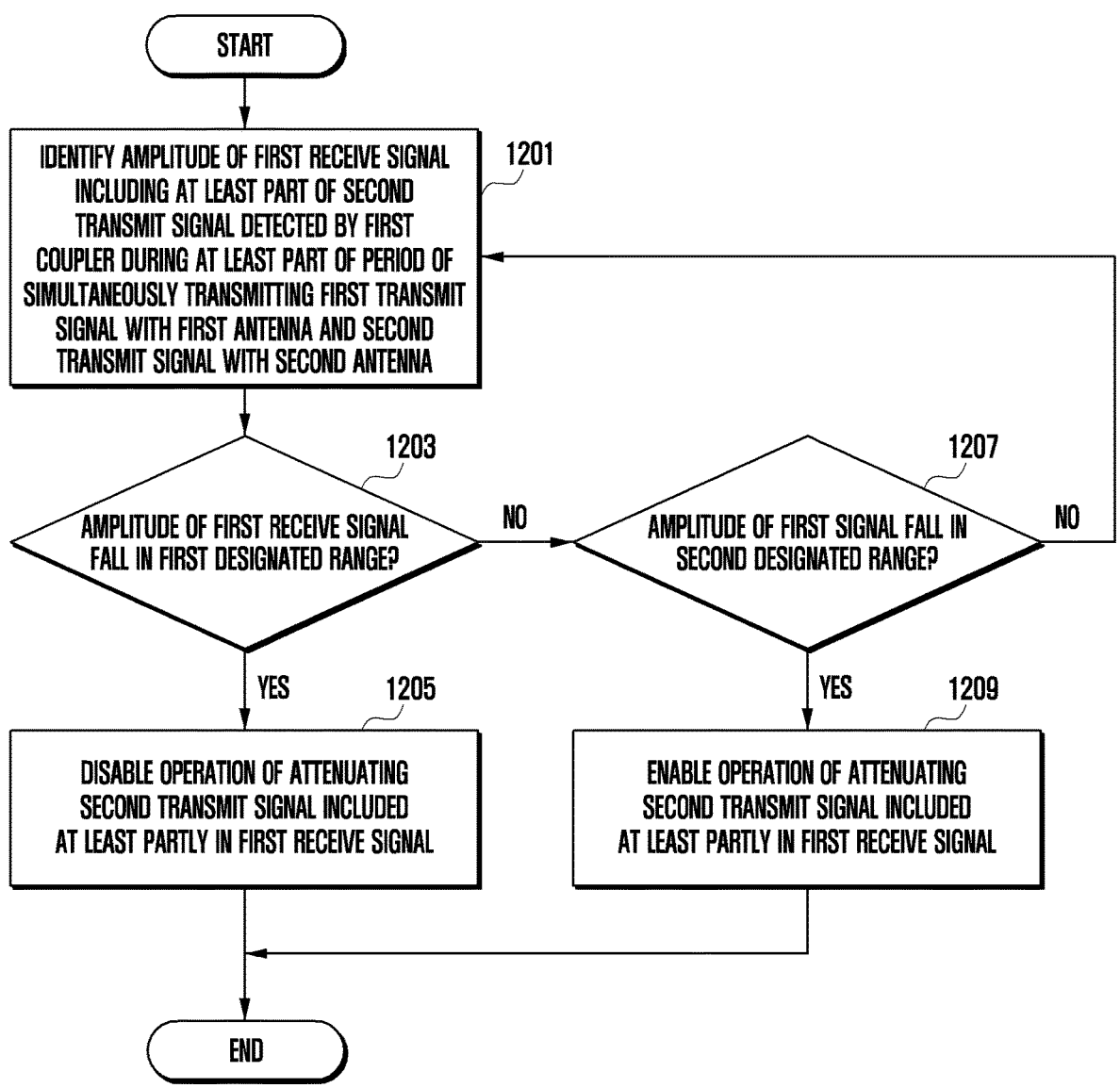
FIG. 9 is a flowchart illustrating a communication signal control method of an electronic device according to an embodiment.

FIG. 9 is a flowchart illustrating a communication signal control method of an electronic device 401 according to an embodiment of the disclosure.

At step 1201, the electronic device 401 may identify an amplitude of a first receive signal (e.g., first network (e.g., legacy network) primary receive signal (LTE PRx)) including at least part of a second transmit signal (e.g., second network (e.g., 5G network) transmit signal (NR Tx)) detected by a first coupler (e.g., first coupler module 727 or 826) during at least part of a period of simultaneously transmitting a first transmit signal (e.g., first network (e.g., legacy network) transmit signal (LTE Tx)) with a first antenna (e.g., first antenna module 631, 741, 841, or 941) and the second transmit signal (e.g., second network (e.g., 5G network) transmit signal (NR Tx)) with a second antenna (e.g., second antenna module 632, 742, 842, or 942) under the control of a control circuit (e.g., at least one of the processor 420, transceiver (610, 710, 810, or 910), modem 640, first communication processor 512, or second communication processor 514).

At step 1203, the electronic device 401 may determine whether the amplitude of the first receive signal (e.g., first network (e.g., legacy network) primary receive signal (LTE PRx)) falls in a first designated range under the control of the control circuit (e.g., at least one of the processor 420, transceiver (610, 710, 810, or 910), modem 640, first communication processor 512, or second communication processor 514).

If it is determined that the amplitude of the first receive signal (e.g., first network (e.g., legacy network) primary receive signal (LTE PRx)) falls in the first designated range, the procedure may go to step 1205.

If it is determined that the amplitude of the first receive signal (e.g., first network (e.g., legacy network) primary receive signal (LTE PRx)) falls in the first designated range, the electronic device 401 may disable, at step 1205, the operation of attenuation of the first transmit signal (e.g., second network (e.g., 5G network) transmit signal (NR Tx)) included at least partly in the first receive signal (e.g., first network (e.g., legacy network) primary receive signal (LTE PRx)) under the control of the control circuit (e.g., at least one of the processor 420, transceiver (610, 710, 810, or 910), modem 640, first communication processor 512, or second communication processor 514).

If it is determined that the amplitude of the first receive signal (e.g., first network (e.g., legacy network) primary receive signal (LTE PRx)) is equal to or greater than the first designated range, the procedure may go to step 1207.

If it is determined that the amplitude of the first receive signal (e.g., first network (e.g., legacy network) primary receive signal (LTE PRx)) is equal to or greater than the first designated range, the electronic device 401 may determine at step 1207 whether the amplitude of the first receive signal (e.g., first network (e.g., legacy network) primary receive signal (LTE PRx)) falls in a second designated range under the control of the control circuit (e.g., at least one of the processor 420, transceiver (610, 710, 810, or 910), modem 640, first communication processor 512, or second communication processor 514). The first designated range may be less in signal strength coverage than the second designated range.

If it is determined that the amplitude of the first receive signal (e.g., first network (e.g., legacy network) primary receive signal (LTE PRx)) is equal to or greater than the second designated range, the procedure may go back to step 1201.

If it is determined that the amplitude of the first receive signal (e.g., first network (e.g., legacy network) primary receive signal (LTE PRx)) falls in the second designated range, the procedure may go to step 1209.

If it is determined that the amplitude of the first receive signal (e.g., first network (e.g., legacy network) primary receive signal (LTE PRx)) falls in the second designated range, the electronic device 401 may enable, at step 1209, the operation of attenuating the second transmit signal (e.g., second network (e.g., 5G network) transmit signal (NR Tx)) included at least partly in the first receive signal (e.g., first network (e.g., legacy network) primary receive signal (LTE PRx)) under the control of the control circuit (e.g., at least one of the processor 420, transceiver (610, 710, 810, or 910), modem 640, first communication processor 512, or second communication processor 514).

Figure 10:
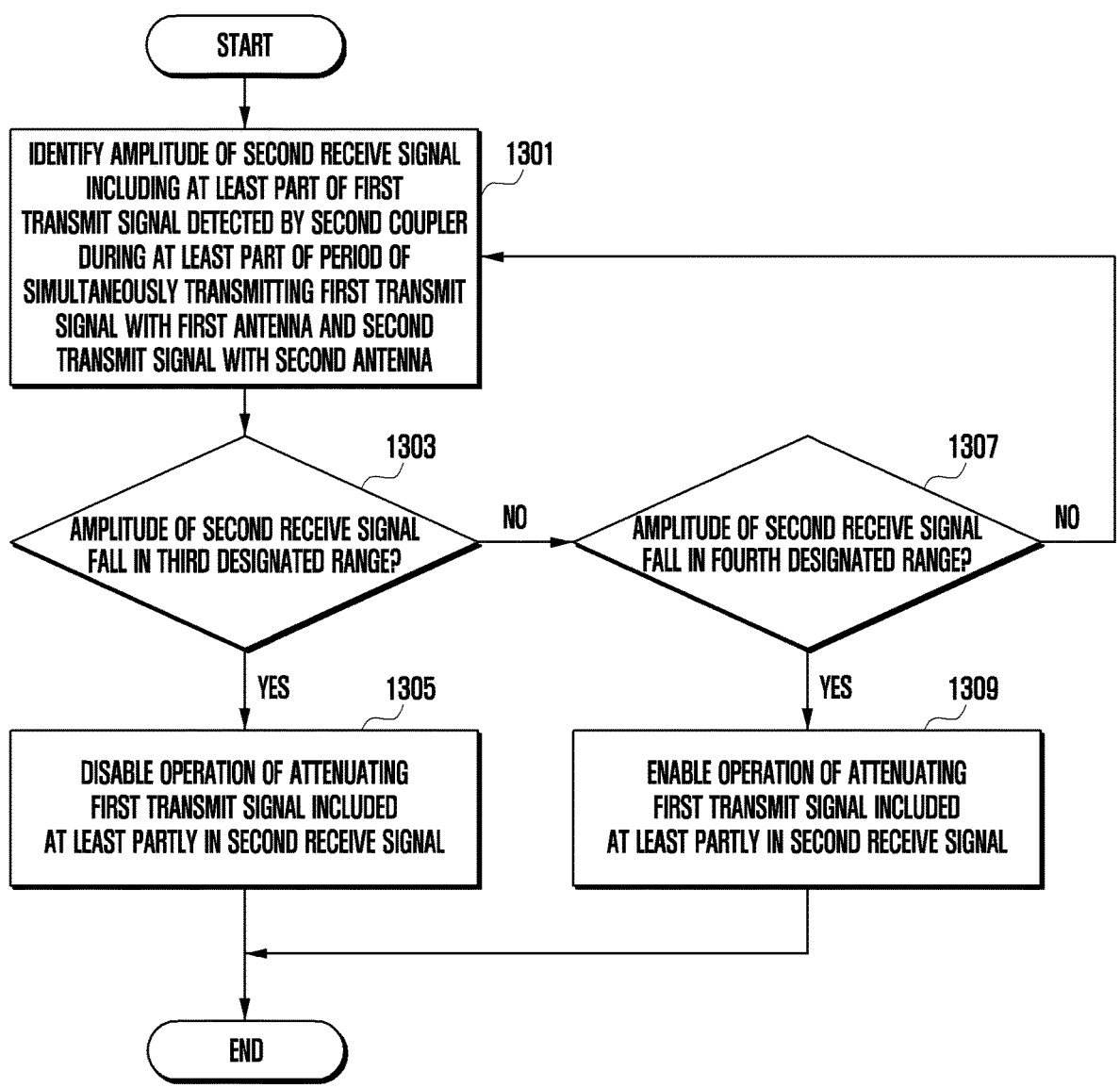
FIG. 10 is a flowchart illustrating a communication signal control method of an electronic device according to an embodiment.

FIG. 10 is a flowchart illustrating a communication signal control method of an electronic device 401 according to an embodiment of the disclosure.

At step 1301, the electronic device 401 may identify an amplitude of a second receive signal (e.g., second network (e.g., 5G network) primary receive signal (NR PRx)) including at least part of a first transmit signal (e.g., first network (e.g., legacy network) transmit signal (LTE Tx)) detected by a second coupler (e.g., second coupler module 737 or 836) during at least part of a period of simultaneously transmitting the first transmit signal (e.g., first network (e.g., legacy network) transmit signal (LTE Tx)) with a first antenna (e.g., first antenna module 631, 741, 841, or 941) and a second transmit signal (e.g., second network (e.g., 5G network) transmit signal (NR Tx)) with a second antenna (e.g., second antenna module 632, 742, 842, or 942) under the control of a control circuit (e.g., at least one of the processor 420, transceiver (610, 710, 810, or 910), modem 640, first communication processor 512, or second communication processor 514).

At step 1303, the electronic device 401 may determine whether the amplitude of the second receive signal (e.g., second network (e.g., 5G network) primary receive signal (NR PRx)) falls in a third designated range under the control of the control circuit (e.g., at least one of the processor 420, transceiver (610, 710, 810, or 910), modem 640, first communication processor 512, or second communication processor 514).

If it is determined that the amplitude of the second receive signal (second network (e.g., 5G network) primary receive signal (NR PRx)) falls in the third designated range, the procedure may go to step 1305.

If it is determined that the amplitude of the second receive signal (second network (e.g., 5G network) primary receive signal (NR PRx)) falls in the third designated range, the electronic device 401 may disable, at step 1305, the operation of attenuating the first transmit signal (e.g., first network (e.g., legacy network) transmit signal (LTE Tx)) included at least partly in the second receive signal (e.g., second network (e.g., 5G network) primary receive signal (NR PRx)) under the control of the control circuit (e.g., at least one of the processor 420, transceiver (610, 710, 810, or 910), modem 640, first communication processor 512, or second communication processor 514).

If it is determined that the amplitude of the second receive signal (second network (e.g., 5G network) primary receive signal (NR PRx)) is equal to or greater than the third designated range, the procedure may go to step 1307.

If it is determined that the amplitude of the second receive signal (e.g., second network (e.g., 5G network) primary receive signal (NR PRx)) is equal to or greater than the third designated range, the electronic device 401 may determine at step 1307 whether the amplitude of the second receive signal (e.g., second network (e.g., 5G network) primary receive signal (NR PRx)) falls in a fourth designated range under the control of the control circuit (e.g., at least one of the processor 420, transceiver (610, 710, 810, or 910), modem 640, first communication processor 512, or second communication processor 514). The third designated range may be less in signal strength coverage than the fourth designated range.

If it is determined that the amplitude of the second receive signal (e.g., second network (e.g., 5G network) primary receive signal (NR PRx)) is equal to or greater than the fourth designated range, the procedure may go back to step 1301.

If it is determined that the amplitude of the second receive signal (e.g., second network (e.g., 5G network) primary receive signal (NR PRx)) falls in the fourth designated range, the procedure may go to step 1309.

If it is determined that the amplitude of the second receive signal (e.g., second network (e.g., 5G network) primary receive signal (NR PRx)) falls in the fourth designated range, the electronic device 401 may enable, at step 1309, the operation of attenuating the first receive signal (e.g., first network (e.g., legacy network) transmit signal (LTE Tx)) included at least partly in the second receive signal (e.g., second network (e.g., 5G network) primary receive signal (NR PRx)) under the control of the control circuit (e.g., at least one of the processor 420, transceiver (610, 710, 810, or 910), modem 640, first communication processor 512, or second communication processor 514).

Figure 11:
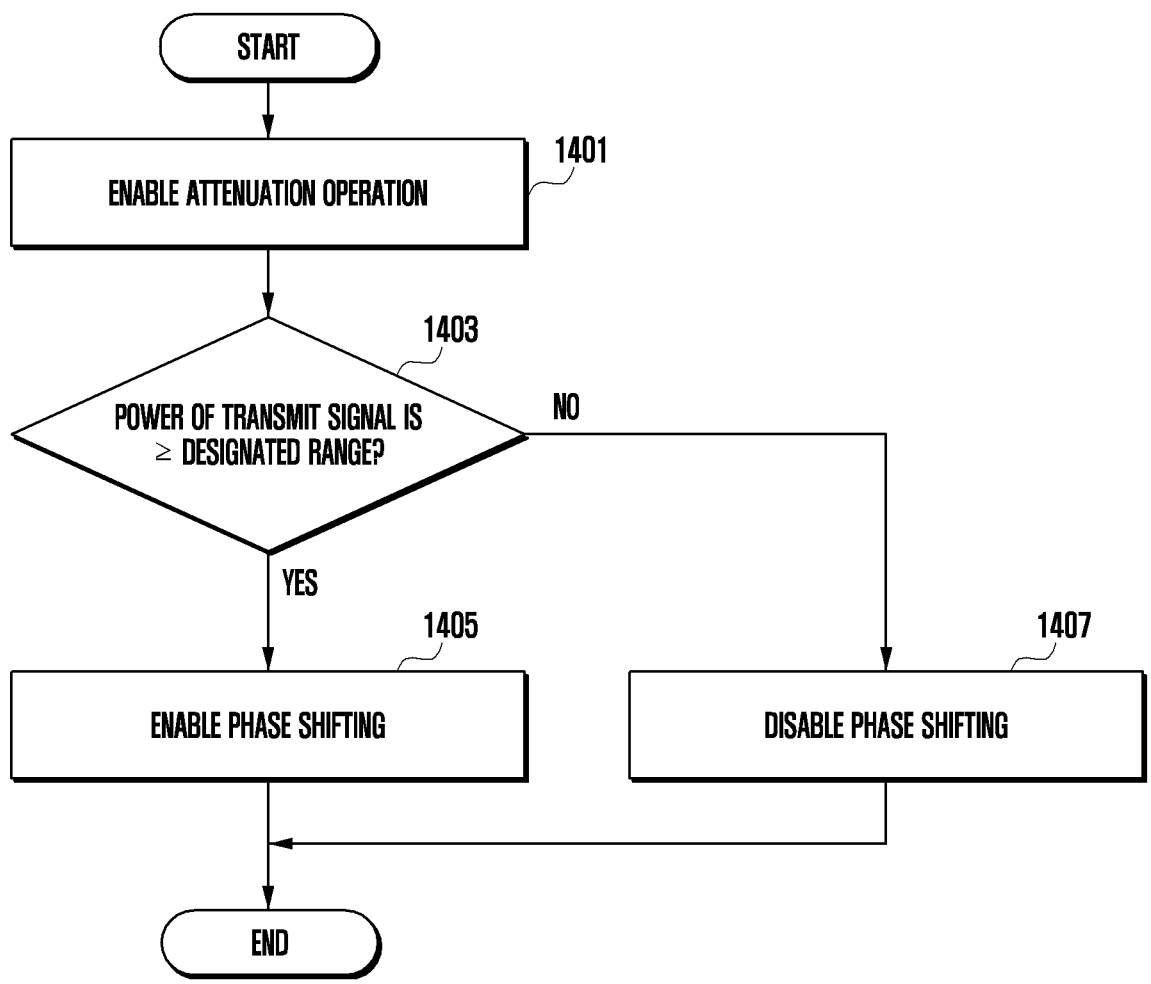
FIG. 11 is a flowchart illustrating a signal attenuation procedure of an electronic device according to an embodiment.

FIG. 11 is a flowchart illustrating a signal attenuation procedure of an electronic device 401 according to an embodiment of the disclosure.

At step 1401, the electronic device 401 may enable an attenuation operation under the control of a control circuit (e.g., at least one of the processor 420, transceiver (610, 710, 810, or 910), modem 640, first communication processor 512, or second communication processor 514). A signal to be attenuated may be a second transmit signal (e.g., second network (e.g., 5G network) transmit signal (NR Tx)) included at least partly in a first receive signal (e.g., first network (e.g., legacy network) primary receive signal (LTE PRx)) or a first transmit signal (e.g., first network (e.g., legacy network) transmit signal (LTE Tx)) included at least partly in the second receive signal (e.g., second network (e.g., 5G network) primary receive signal (NR PRx)) as described with reference to FIGS. 9 and 10.

At step 1403, the electronic device 401 may determine whether an amplitude or power of the second transmit signal (e.g., second network (e.g., 5G network) transmit signal (NR Tx)) included at least partly in the first receive signal (e.g., first network (e.g., legacy network) primary receive signal (LTE PRx)) or the first transmit signal (e.g., first network (e.g., legacy network) transmit signal (LTE Tx)) included at least partly in the second receive signal (e.g., second network (e.g., 5G network) primary receive signal (NR PRx)) is equal to or greater than a designated range.

If it is determined that the amplitude or power of the second transmit signal (e.g., second network (e.g., 5G network) transmit signal (NR Tx)) included at least partly in the first receive signal (e.g., first network (e.g., legacy network) primary receive signal (LTE PRx)) or the first transmit signal (e.g., first network (e.g., legacy network) transmit signal (LTE Tx)) included at least partly in the second receive signal (e.g., second network (e.g., 5G network) primary receive signal (NR PRx)) is equal to or greater than a designated range, the electronic device 401 may enable, at step 1405, phase shifting of the transmit signal under the control of the control circuit (e.g., at least one of the processor 420, transceiver (610, 710, 810, or 910), modem 640, first communication processor 512, or second communication processor 514).

If it is determined that the amplitude or power of the second transmit signal (e.g., second network (e.g., 5G network) transmit signal (NR Tx)) included at least partly in the first receive signal (e.g., first network (e.g., legacy network) primary receive signal (LTE PRx)) or the first transmit signal (e.g., first network (e.g., legacy network) transmit signal (LTE Tx)) included at least partly in the second receive signal (e.g., second network (e.g., 5G network) primary receive signal (NR PRx)) is less than the designated range, the electronic device 401 may disable, at step 1407, phase shifting on the transmit signal under the control of the control circuit (e.g., at least one of the processor 420, transceiver (610, 710, 810, or 910), modem 640, first communication processor 512, or second communication processor 514).

Figure 12:
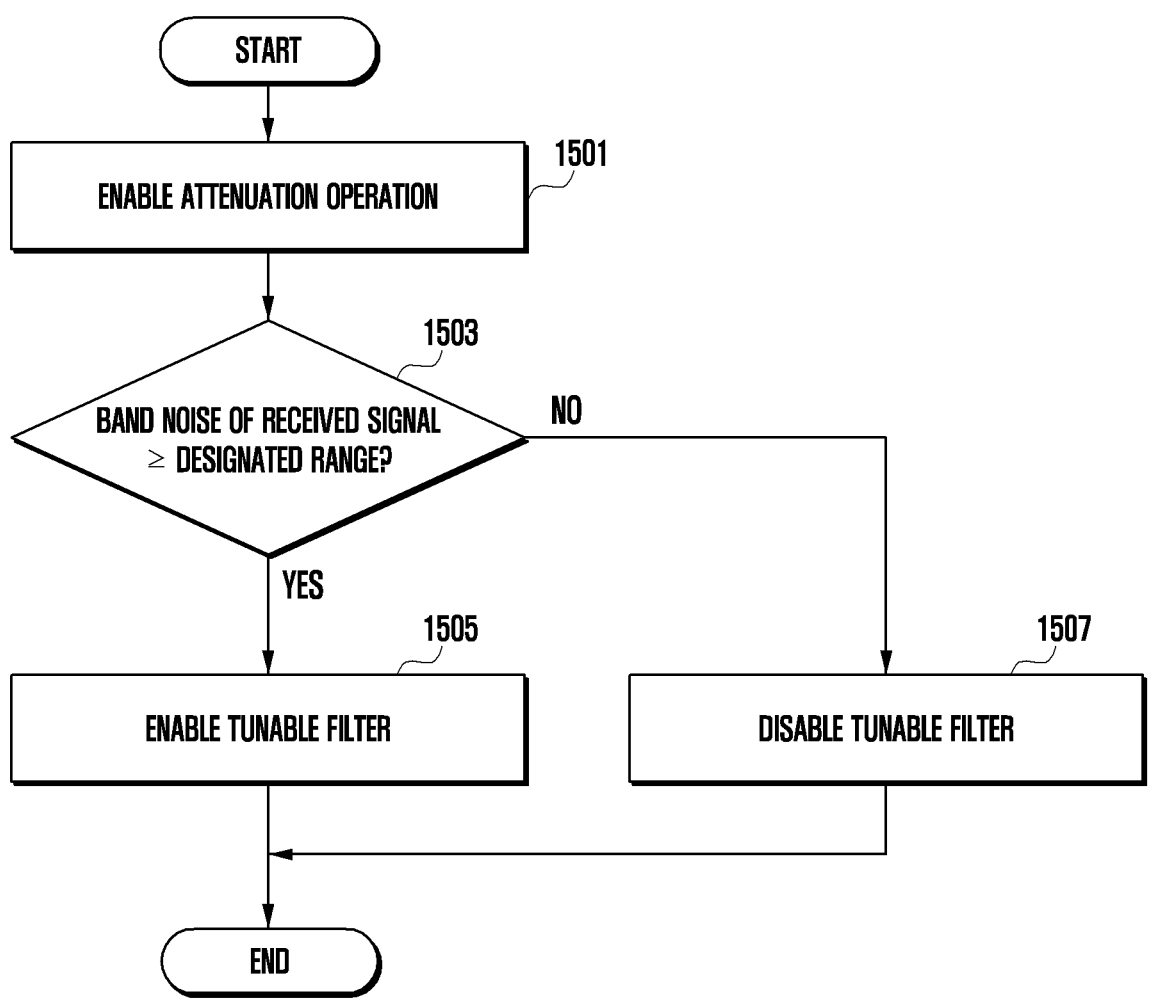
FIG. 12 is a flowchart illustrating a signal attenuation procedure of an electronic device according to an embodiment.

FIG. 12 is a flowchart illustrating a signal attenuation procedure of an electronic device 401 according to an embodiment of the disclosure.

At step 1501, the electronic device 401 may enable an attenuation operation under the control of a control circuit (e.g., at least one of the processor 420, transceiver (610, 710, 810, or 910), modem 640, first communication processor 512, or second communication processor 514).

At step 1503, the electronic device 401 may determine whether an amplitude of a band noise of a first receive signal (e.g., first network (e.g., legacy network) primary receive signal (LTE PRx)) or a second receive signal (e.g., second network (e.g., 5G network) primary receive signal (NR PRx)) is equal to or greater than a designated range under the control of the control circuit (e.g., at least one of the processor 420, transceiver (610, 710, 810, or 910), modem 640, first communication processor 512, or second communication processor 514).

If it is determined that the amplitude of the band noise of the first receive signal (e.g., first network (e.g., legacy network) primary receive signal (LTE PRx)) or the second receive signal (e.g., second network (e.g., 5G network) primary receive signal (NR PRx)) is equal to or greater than the designated range, the electronic device 401 may enable, at step 1505, a tunable filter that is capable of controlling the band noise under the control of the control circuit (e.g., at least one of the processor 420, transceiver (610, 710, 810, or 910), modem 640, first communication processor 512, or second communication processor 514).

If it is determined that the amplitude of the band noise of the first receive signal (e.g., first network (e.g., legacy network) primary receive signal (LTE PRx)) or the second receive signal (e.g., second network (e.g., 5G network) primary receive signal (NR PRx)) is less than the designated range, the electronic device 401 may disable, at step 1507, the tunable filter that is capable of controlling the band noise under the control of the control circuit (e.g., at least one of the processor 420, transceiver (610, 710, 810, or 910), modem 640, first communication processor 512, or second communication processor 514).

As described above, the methods and electronic devices of the certain disclosed embodiments are advantageous in terms of protecting against antenna performance degradation by mitigating inter-communication system signal interference.

The methods and electronic devices of the certain disclosed embodiments are also advantageous in terms of improving multi-communication system connectivity performance by mitigating inter-communication signal interference.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
   a first antenna;
   a second antenna;
   a first communication circuit configured to communicate in a first frequency band with the first antenna at a first data rate;
   a second communication circuit configured to communicate in a second frequency band with the second antenna at a second data rate higher than the first data rate;
   a first coupler electrically connected between the first antenna and the first communication circuit;
   at least one control circuit configured to:
      control to identify, during at least part of a period of simultaneously transmitting a first transmit signal with the first antenna and a second transmit signal with the second antenna, an amplitude of a first receive signal including at least part of the second transmit signal detected by the first coupler,
      disable an operation of attenuating the at least part of the second transmit signal included in the first receive signal based on the amplitude of the first receive signal falling in a first designated range, and
      enable the operation of attenuating the at least part of the second transmit signal included in the first receive signal based on the amplitude of the first receive signal falling in a second designated range; and
   a coupler module configured to perform the operation of attenuating the at least part of the second transmit signal included in the first receive signal under the control of the control circuit, the coupler module including:
      a first switch including a first terminal connected to a side of the first coupler closer to the first communication circuit, a second terminal connected to a third switch, and configured to divert the first transmit signal to be used as a feedback receive signal when the first terminal is connected to the second terminal, and
      a second switch including a third terminal connected to an opposite side of the first coupler closer to the first antenna, a fourth terminal connected to the third switch, a fifth terminal, and configured to:
         allow transmission of the first receive signal so that the at least one control circuit identifies the amplitude of the first receive signal, when the third terminal is connected to the fourth terminal,
         allow transmission of a signal to attenuate the at least part of the second transmit signal to the first coupler, when the third terminal is connected to the fifth terminal, and
         block the signal to attenuate the at least part of the second transmit signal, when the operation of attenuating the at least part of the second transmit signal is disabled and when the third terminal is disconnected from the fifth terminal.

2. The electronic device of claim 1, further comprising a second coupler electrically connected between the second antenna and the second communication circuit.

3. The electronic device of claim 2, wherein the control circuit is further configured to:
   control to identify, during at least part of the period of simultaneously transmitting the first transmit signal with the first antenna and the second transmit signal with the second antenna, an amplitude of a second receive signal including at least part of the first transmit signal detected by the second coupler, disable an operation of attenuating the at least part of the first transmit signal included in the second receive signal based on the amplitude of the second receive signal falling in a third designated range, and enable the operation of attenuating the at least part of the first transmit signal included in the second receive signal based on the amplitude of the second receive signal falling in a fourth designated range.

4. The electronic device of claim 1, wherein the control circuit comprises a processor, a communication processor, a modem, and/or a transceiver.

5. The electronic device of claim 1, wherein the first communication circuit and the second communication circuit are implemented in a single package or chip.

6. The electronic device of claim 1, further comprising a tunable filter configured to attenuate the at least part of the second transmit signal included in the first receive signal.

7. The electronic device of claim 6, wherein the tunable filter comprises a notch filter configured to remove signals in a frequency band of the at least part of the second transmit signal included in the first receive signal.

8. The electronic device of claim 1, wherein the coupler module comprises a phase shifter and an amplifier, the phase shifter being used in the operation of attenuating the at least part of the second transmit signal included in the first receive signal.

9. The electronic device of claim 8, wherein the phase shifter is configured to generate an anti-phase signal of the at least part of the second transmit signal included in the first receive signal to attenuate the at least part of the second transmit signal included in the first receive signal.

10. The electronic device of claim 1, wherein the control circuit comprises a signal controller configured to generate an anti-phase signal of the at least part of the second transmit signal included in the first receive signal to attenuate the at least part of the second transmit signal included in the first receive signal.

11. The electronic device of claim 3, further comprising a tunable filter configured to attenuate the at least part of the first transmit signal included in the second receive signal.

12. The electronic device of claim 11, wherein the tunable filter comprises a notch filter configured to remove signals in a frequency band of the at least part of the first transmit signal included in the second receive signal.

13. The electronic device of claim 3, further comprising another coupler module configured to perform the operation of attenuating the at least part of the first transmit signal included in the second receive signal under the control of the control circuit, wherein the other coupler module comprises a phase shifter and an amplifier, the phase shifter being used in the operation of attenuating the at least part of the first transmit signal included in the second receive signal.

14. The electronic device of claim 13, wherein the phase shifter is configured to generate an anti-phase signal of the at least part of the first transmit signal included in the second receive signal to attenuate the at least part of the first transmit signal included in the second receive signal.

15. The electronic device of claim 13, wherein the control circuit comprises a signal controller configured to generate an anti-phase signal of the at least part of the first transmit signal included in the second receive signal to attenuate the at least part of the first transmit signal included in the second receive signal.

16. The electronic device of claim 1, further comprising a signal splitter directly connected the second communication circuit, the signal splitter configured to divert the at least part of the second transmit signal from the second communication circuit to the coupler module.

17. A signal control method of an electronic device, the method comprising:

identifying, during at least part of a period of simultaneously transmitting a first transmit signal with a first antenna and a second transmit signal with a second antenna, an amplitude of a first receive signal including at least part of the second transmit signal detected by a first coupler;

disabling an operation of attenuating the at least part of the second transmit signal included in the first receive signal based on the amplitude of the first receive signal falling in a first designated range; and enabling the operation of attenuating the at least part of the second transmit signal included in the first receive signal based on the amplitude of the first receive signal falling in a second designated range, wherein the electronic device comprises a coupler module configured to perform the operation of attenuating the at least part of the second transmit signal included in the first receive signal, the coupler module including:

a first switch including a first terminal connected to a side of the first coupler, a second terminal connected to a third switch, and configured to divert the first transmit signal to be used as a feedback receive signal when the first terminal is connected to the second terminal, and a second switch including a third terminal connected to an opposite side of the first coupler closer to the first antenna, a fourth terminal connected to the third switch, a fifth terminal, and configured to:

allow transmission of the first receive signal to identify the amplitude of the first receive signal, when the third terminal is connected to the fourth terminal, allow transmission of a signal to attenuate the at least part of the second transmit signal to the first coupler, when the third terminal is connected to the fifth terminal, and block the signal to attenuate the at least part of the second transmit signal, when the operation of attenuating the at least part of the second transmit signal is disabled and when the third terminal is disconnected from the fifth terminal.

18. The method of claim 17, wherein the operation of attenuating the at least part of the second transmit signal included in the first receive signal further comprises enabling a phase shifting operation on the at least part of the second transmit signal included in the first receive signal when the amplitude of the first receive signal is greater than the first designated range and falls in the second designated range.

19. The method of claim 17, wherein the operation of attenuating the at least part of the second transmit signal included in the first receive signal further comprises enabling a tunable filter capable of controlling a band noise of the at least part of the second transmit signal included in the first receive signal when the amplitude of the first receive signal is greater than the first designated range and falls in the second designated range.

20. The method of claim 17, further comprising:

identifying, during at least part of the period of simultaneously transmitting the first transmit signal with the first antenna and the second transmit signal with the second antenna, an amplitude of a second receive signal including at least part of the first transmit signal detected by a second coupler;

disabling an operation of attenuating the at least part of the first transmit signal included in the second receive signal based on the amplitude of the second receive signal falling in a third designated range; and enabling the operation of attenuating the at least part of the first transmit signal included in the second receive signal based on the amplitude of the second receive signal falling in a fourth designated range.

* * * * *